United States Patent [19]
Bird et al.

[11] Patent Number: 5,482,230
[45] Date of Patent: Jan. 9, 1996

[54] VEHICLE BULKHEAD SAFETY SYSTEM

[75] Inventors: Michael S. Bird, Lake Worth, Fla.;
Andreas Demopolous, Leighton Buzzard, England

[73] Assignee: B E Aerospace, Inc., Delray Beach, Fla.

[21] Appl. No.: 83,999

[22] Filed: Jun. 25, 1993

[51] Int. Cl.[6] .............................. B64D 25/04; B64C 1/12
[52] U.S. Cl. ...................... 244/121; 244/118.5; 280/753; 280/730.1
[58] Field of Search ................. 244/118.5, 121; 280/730 R, 732, 753, 752, 751

[56] References Cited

U.S. PATENT DOCUMENTS

| | | | |
|---|---|---|---|
| 2,710,731 | 6/1955 | Bright et al. | 244/118.6 |
| 3,243,822 | 3/1964 | Lipkin | 244/121 |
| 3,423,121 | 2/1967 | Lipkin | 244/121 |
| 3,603,535 | 9/1971 | DePolo | 244/121 |
| 3,614,129 | 10/1971 | Sobkow | 244/121 |
| 3,744,818 | 7/1973 | Sandberg | 280/752 |
| 3,774,713 | 11/1973 | Stegmaier | 280/752 |
| 4,565,535 | 1/1986 | Tassy | 244/121 |
| 4,728,059 | 3/1988 | Stephen et al. | 244/121 |
| 4,765,569 | 8/1988 | Higgins | 244/121 |
| 4,796,913 | 1/1989 | Amabile | 280/751 |
| 4,810,005 | 3/1989 | Fohl | 280/732 |
| 4,957,250 | 9/1990 | Hararat-Tehrani | 244/121 |
| 5,031,862 | 7/1991 | Rhodes | 244/121 |
| 5,072,967 | 12/1991 | Batchelder et al. | 244/121 |
| 5,190,313 | 3/1993 | Hickling | 244/121 |
| 5,340,059 | 8/1994 | Kanigowski | 244/121 |
| 5,356,177 | 10/1994 | Weller | 280/751 |

*Primary Examiner*—Andres Kashnikow
*Assistant Examiner*—Virna Lissi Mojica
*Attorney, Agent, or Firm*—Quarles & Brady

[57] ABSTRACT

A safety system for reducing the risk of injury during a survivable crash of a high-speed passenger vehicle. The safety system includes at least one bulkhead support base mounted to a vehicle within a passenger compartment and a bulkhead panel mounted to a portion of the bulkhead support base. In addition, the device includes energy-absorbing means associated with the bulkhead panel for absorbing the energy of a passenger impacting on the bulkhead panel. In this manner, the system minimizes injury to a passenger striking upon a bulkhead wall or class-divider wall within the vehicle. A triggering system is also provided for electronically activating the safety system when necessary.

10 Claims, 29 Drawing Sheets

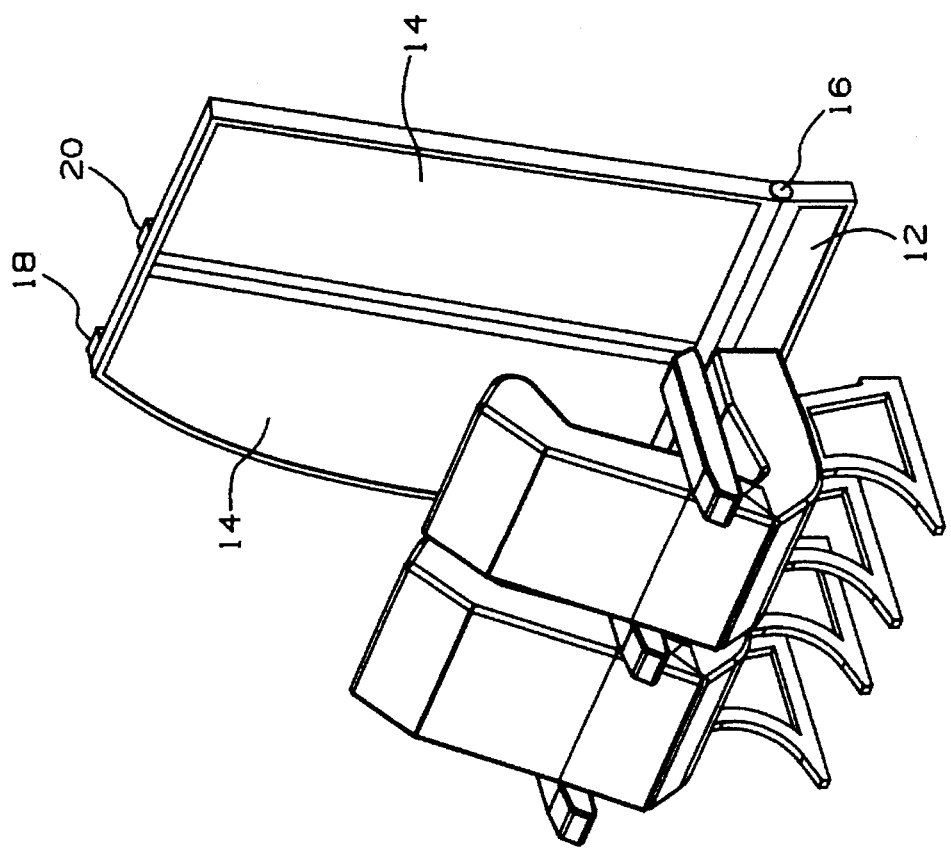
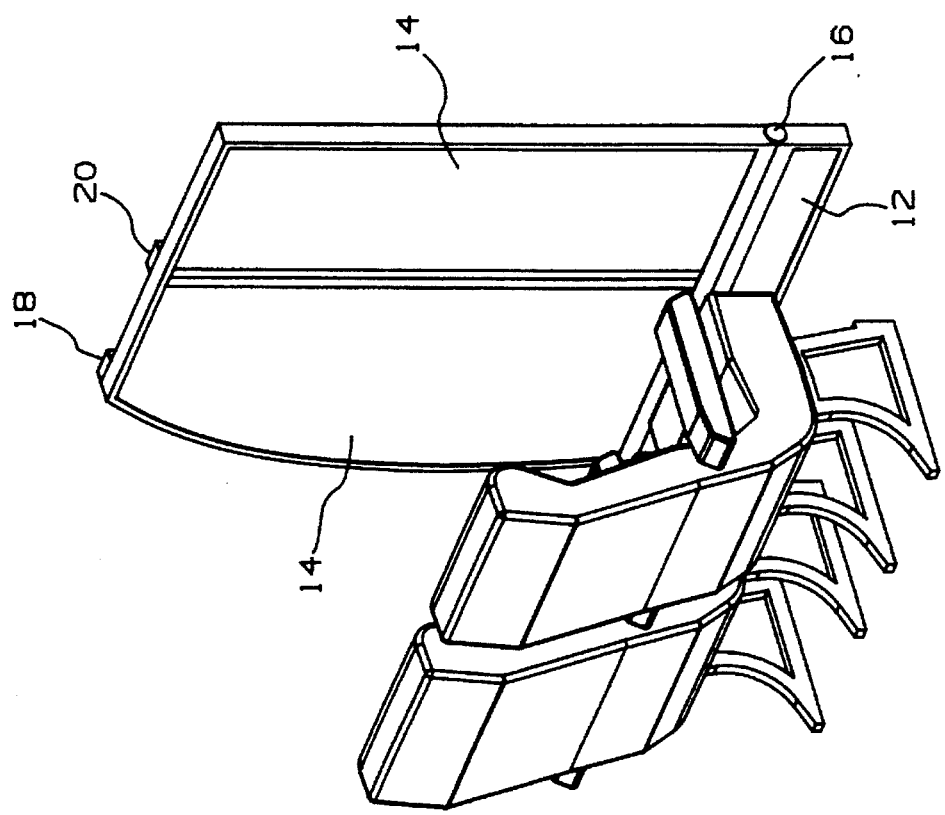

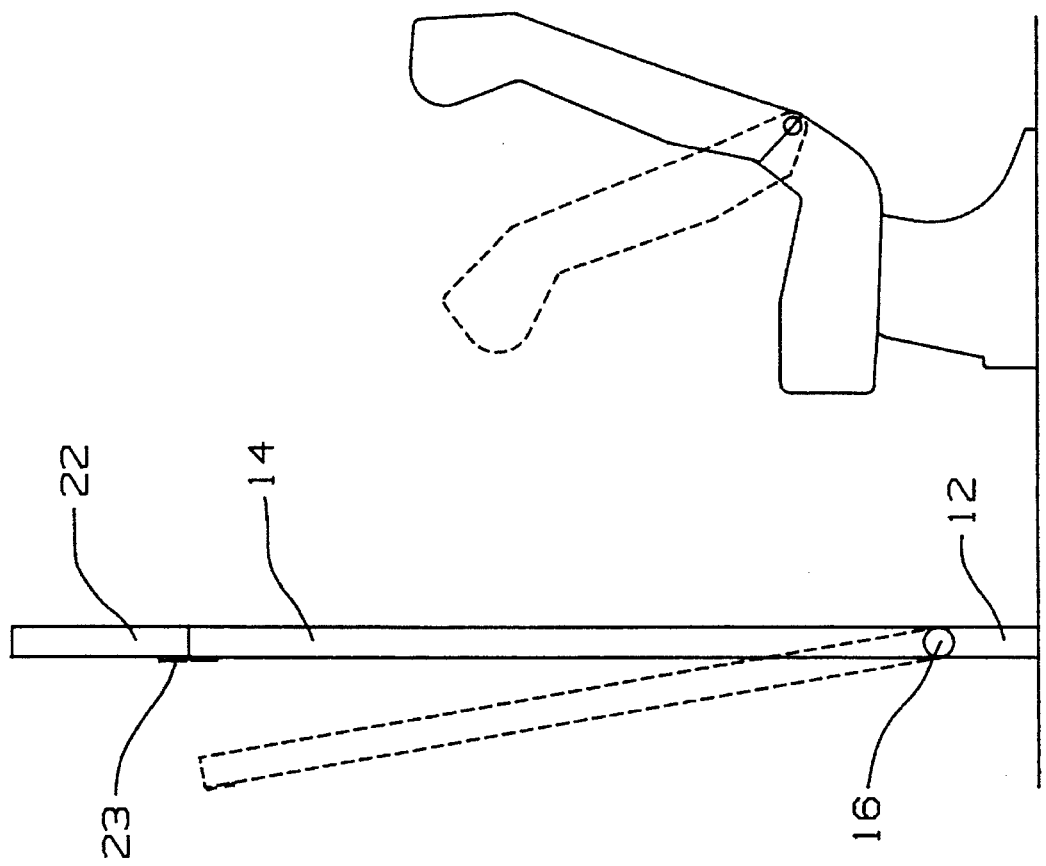

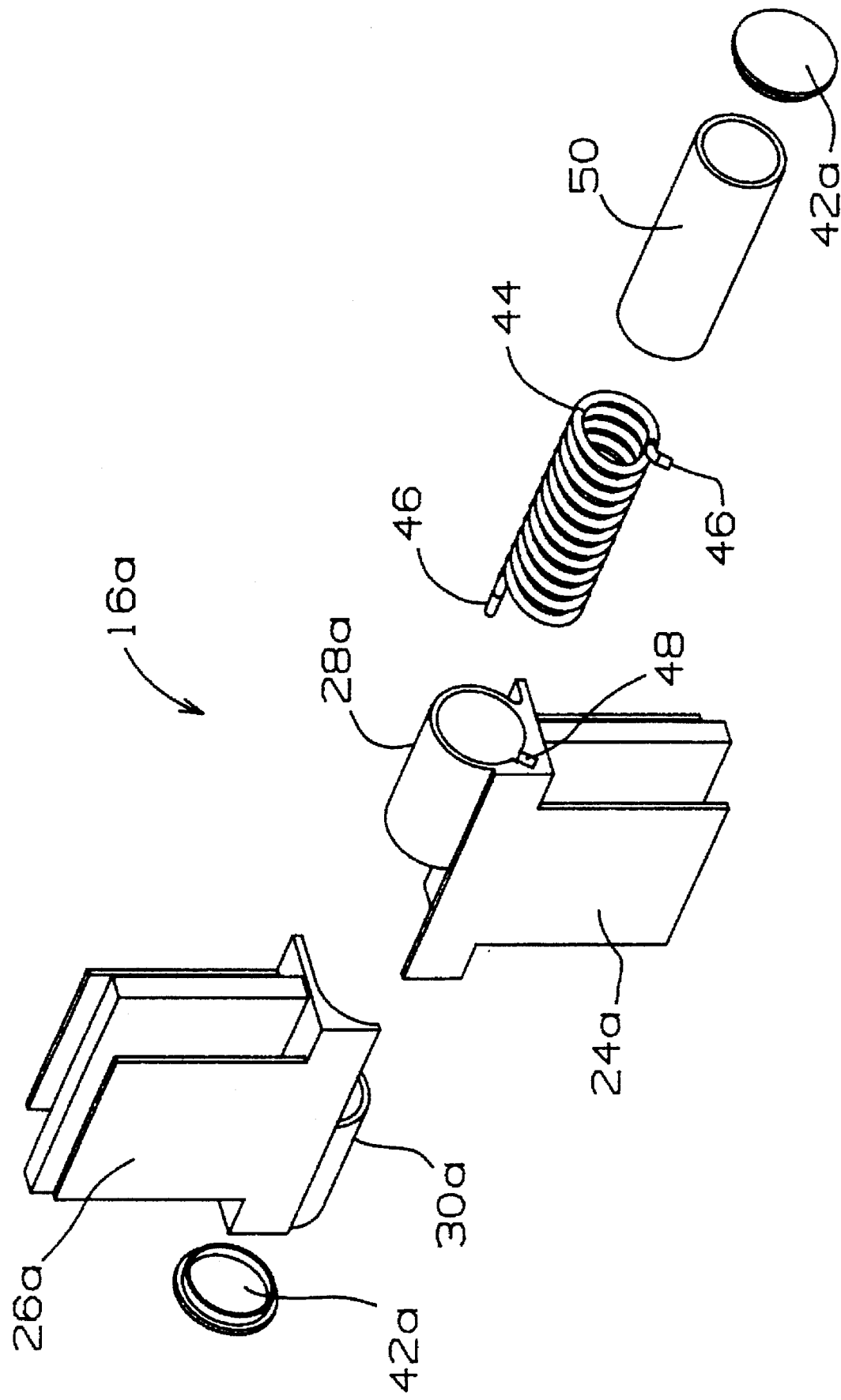

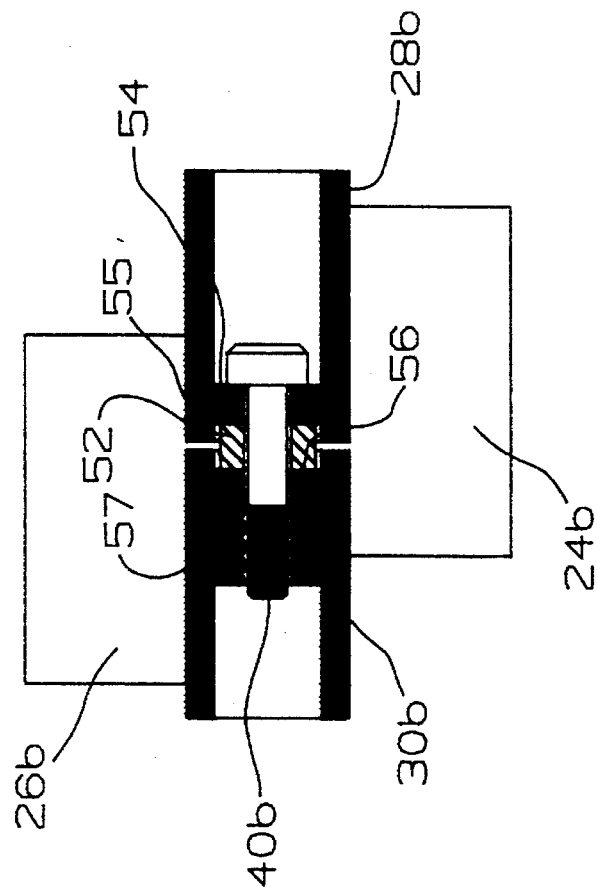
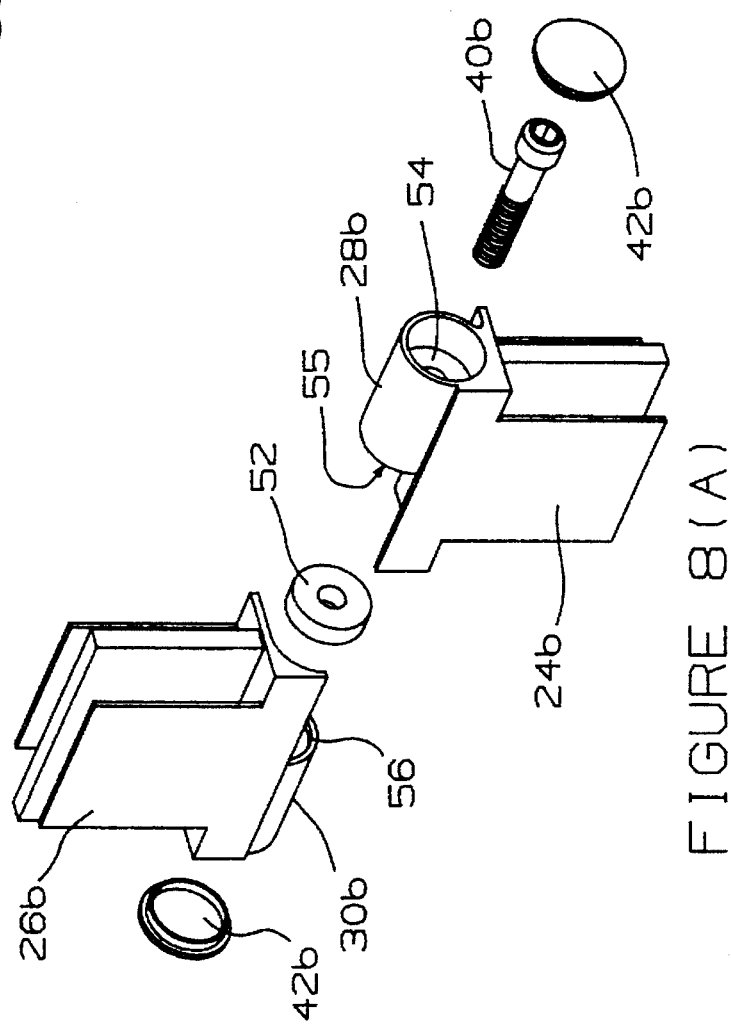
FIGURE 8(B)
FIGURE 8(A)

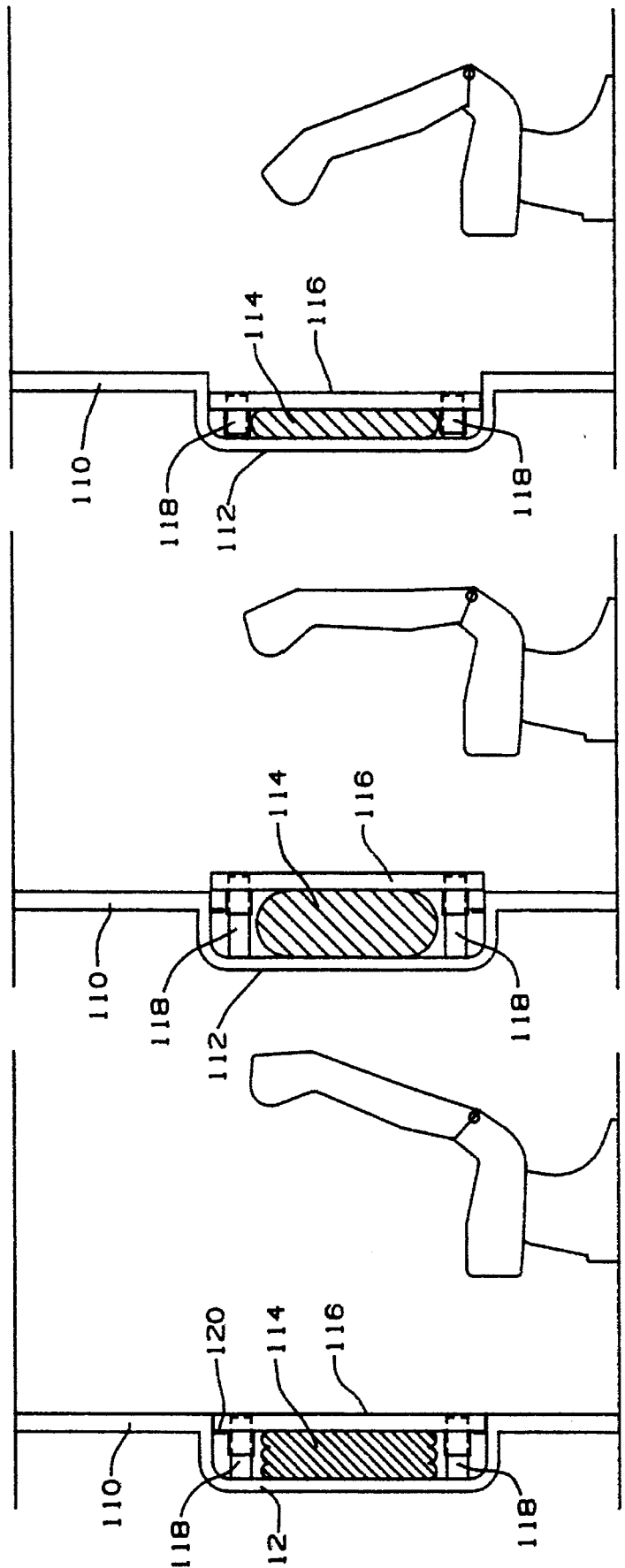

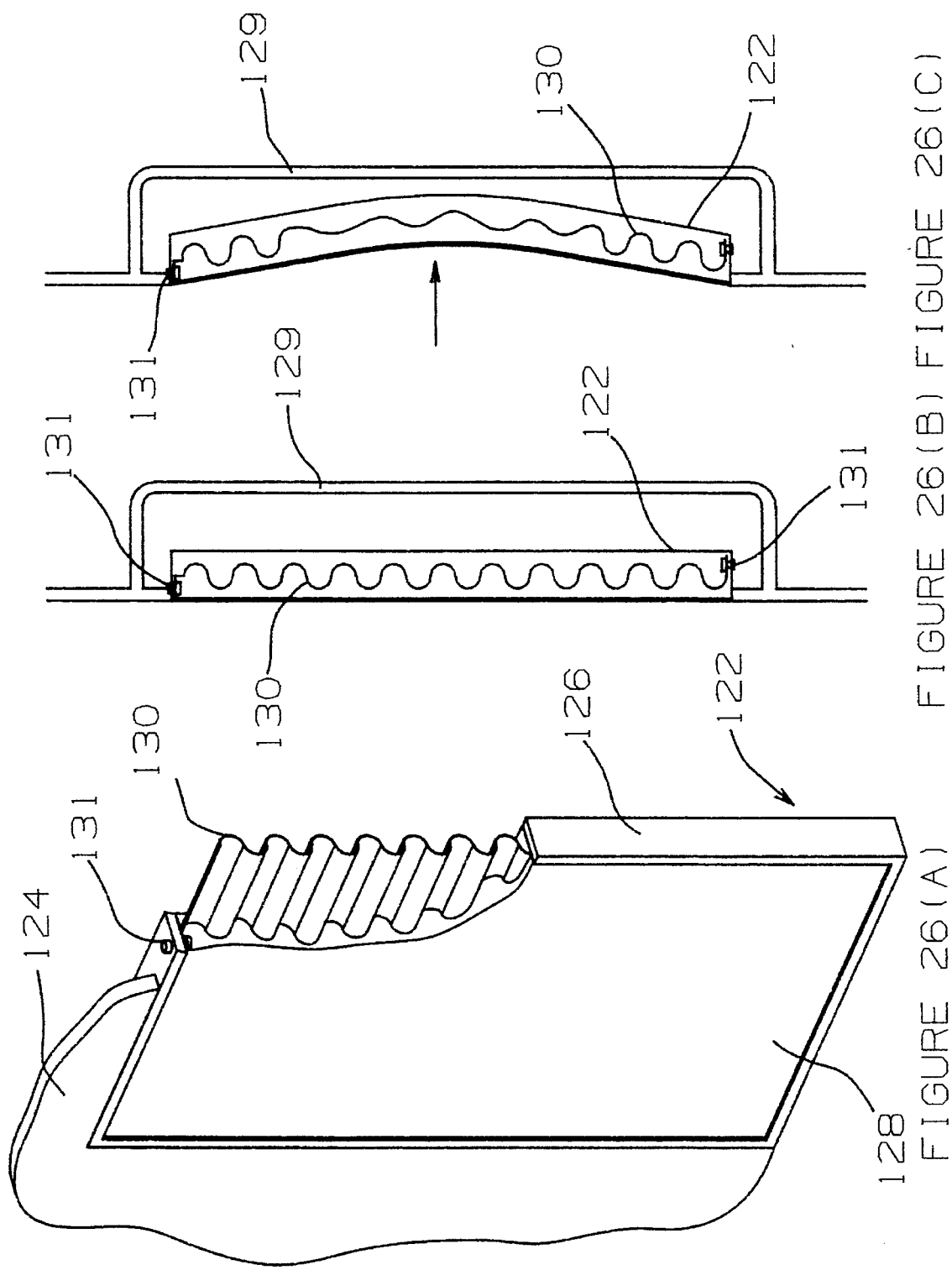

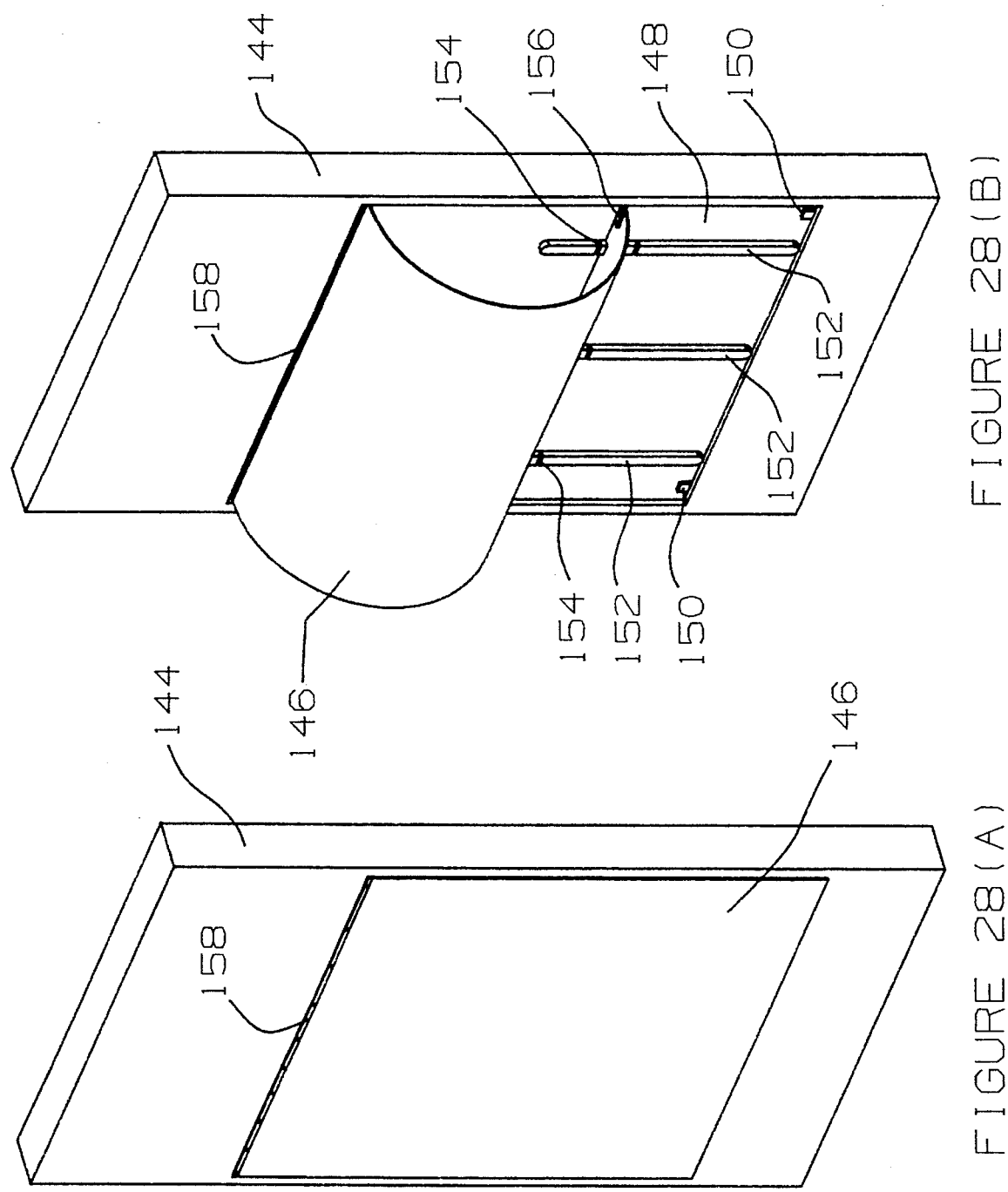

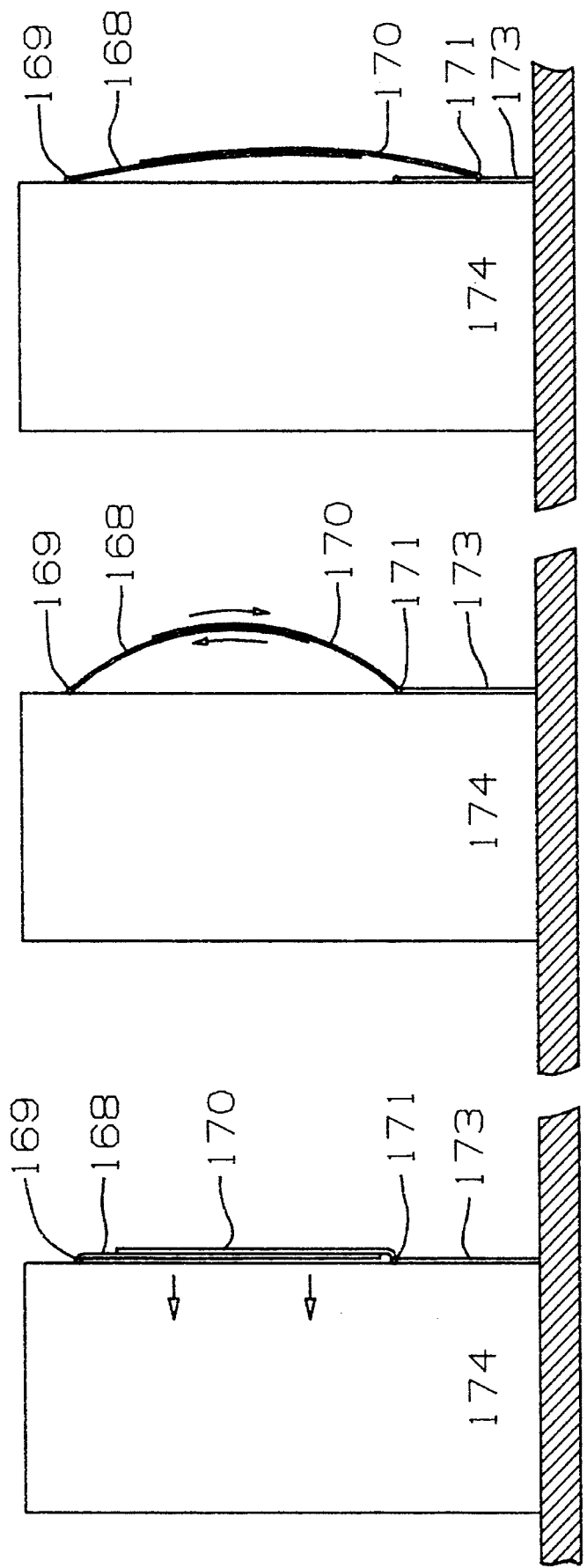

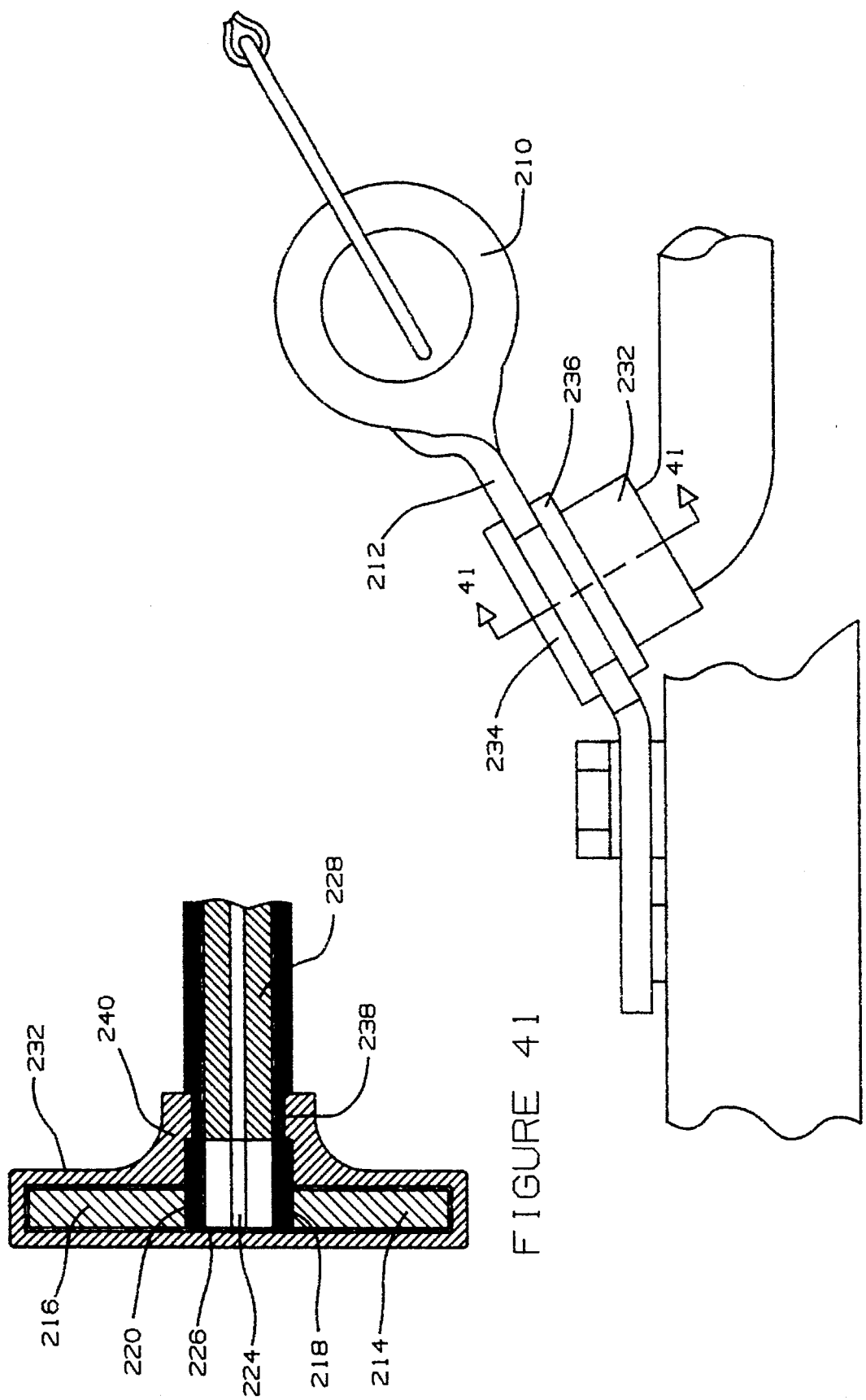

VEHICLE BULKHEAD SAFETY SYSTEM

BACKGROUND OF THE INVENTION

A significant problem exists for passengers in transport vehicles such as airliners whenever such passengers are seated in rows which are directly facing vehicle bulkheads or class divider walls. Specifically, passengers seated in such rows suffer from a much greater risk of injury during a survivable crash as compared to the majority of the other passengers in the aircraft. The reason for the increased risk of injury is that airliner seat backs are typically designed such that they will collapse forwardly when struck from behind by a passenger during crash conditions. The seat back collapses in an energy-absorbing manner, thus decelerating the movement of the passenger and minimizing the risk of serious injury which might otherwise be sustained. By comparison, passengers who are seated in rows directly behind bulkheads or class dividers do not have the benefit of such collapsible seat mechanisms. The sudden deceleration generally associated with a crash generally has a tendency to throw a passenger forward, stretching the passenger's seatbelt. For passengers seated behind the bulkheads or class dividers, this forward motion is usually sufficient to cause the passenger's head to strike the bulkhead or class divider, thus causing severe head injury.

There have been a number of inventions proposed to improve passenger safety for passengers who are not seated in bulkhead or class divider rows. For example, Tassy U.S. Pat. No. 4,565,535 discloses an inflatable personal vehicle crash barrier and water flotation life preserver. According to Tassy, the airbags, when inflated, firmly wedge an air passenger in their seat, and thereby prevents injuries resulting from a crash. Higgins U.S. Pat. No. 4,765,569 discloses a passive restraint system for a high speed transport vehicle which also utilizes inflatable bags placed in the backs of seats of the vehicle. Significantly, however, these inventions do not disclose any method for minimizing injury to passengers seated in rows directly behind bulkheads or class dividers while simultaneously avoiding any interference with exit paths from the vehicle.

SUMMARY OF THE INVENTION

According to the present invention, a safety system is provided for reducing the risk of injury to a passenger seated behind a bulkhead or class divider row in a transport vehicle. The system includes at least one bulkhead support base mounted to the vehicle within the passenger compartment and a bulkhead panel mounted to a portion of the bulkhead support base. Energy absorbing means associated with the bulkhead panel are provided for absorbing the energy of a passenger thrown forwardly into the bulkhead panel in a crash. The energy-absorbing means can include an inflatable airbag, an energy-absorbing pivot mechanism, a gas cylinder system, deformable panels, elastic panels or a combination of same. The bulkhead panel surface is preferably formed from a compliant material to further absorb the kinetic energy of a thrown passenger. The bulkhead panel can be mounted to the bulkhead support base in a hinged manner, on slidable tracks, or in a stationary position.

A triggering mechanism can be provided for initiating the safety system. The triggering mechanism can be attached to the passenger seatbelt to trigger upon sufficient stress being exerted upon said seatbelt. The seatbelt type triggering mechanism can operate by means of a deformable main body which causes an electrical connection to be formed between two metal contacts positioned in a crush area defined by the crush members.

BRIEF DESCRIPTION OF THE DRAWINGS

FIG. 1 is a perspective view of a first embodiment of the present invention positioned in front of a row of seats.

FIG. 2 is a perspective view of the first embodiment of the present invention positioned in front of a row of seats, after impact by a passenger.

FIG. 5 is a side view of the first embodiment of the present invention shown with an auxiliary support bulkhead.

FIG. 7 is a perspective view of an alternative pivot mechanism for use with the first embodiment 0f the present invention, shown in exploded form.

FIG. 8A is a perspective view of a second alternative pivot mechanism for use with the first embodiment of the present invention, shown in exploded form.

FIG. 8B is a cutaway side view of the pivot mechanism shown in FIG. 8A.

FIG. 20 is a side view of a third embodiment of the invention under normal conditions.

FIG. 21 is a side view of the third embodiment of the invention with the bulkhead panel partially extended.

FIG. 22 is a side view of the third embodiment of the invention with the bulkhead panel retracted after impact by a passenger.

FIG. 26A shows a perspective view of a fourth embodiment according to the present invention.

FIG. 26B shows a side view of the fourth embodiment according to the present invention.

FIG. 26C shows a side view of the fourth embodiment according to the invention after impact by a passenger.

FIGS. 28A and 28B show a sixth embodiment of the present invention in stored and deployed positions, respectively.

FIGS. 34A–34C are side views of the seventh embodiment according to the invention of FIG. 33 in stored, deployed and retracted positions, respectively.

FIG. 40 is a side view of the triggering device according to FIG. 38.

FIG. 41 is a cutaway view along line 41—41 in FIG. 40.

DETAILED DESCRIPTION OF THE INVENTION

Figure 4:
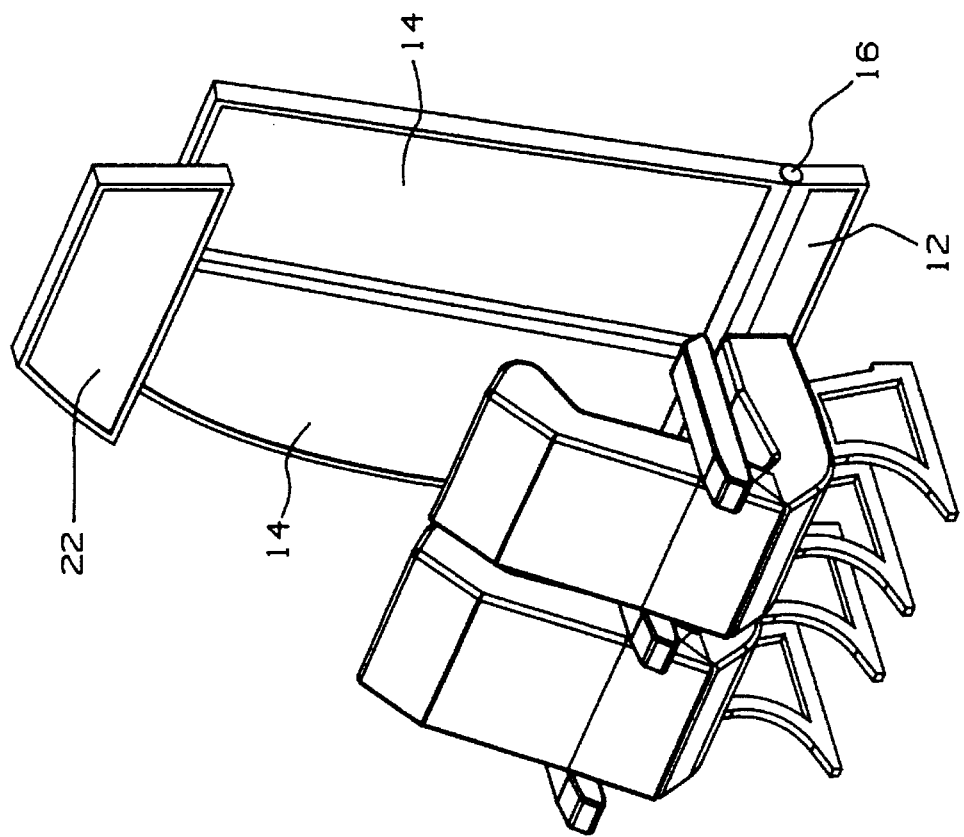
FIG. 4 is a perspective view of the first embodiment of the present invention, shown with an auxiliary support bulkhead, after impact by a passenger.

The safety system of the present invention includes a number of alternative embodiments, each including a bulkhead support base, a bulkhead panel with an associated energy-absorbing mechanism for absorbing an impact energy, and a triggering mechanism. A first embodiment of the present invention is shown in FIGS. 1 through 5. As shown in FIG. 1, the invention includes bulkhead panels 14 which are independently pivotally mounted to a bulkhead support base 12 by means of energy-absorbing pivots 16. The bulkhead support base 12 is mounted to a structurally rigid portion of the airliner or other vehicle in which it is installed.

When either of the bulkhead panels 14 is struck by a passenger during a crash, the impact on the bulkhead causes the panel to pivot forwardly. As the bulkhead panel pivots, the energy from the impact is absorbed by energy-absorbing pivot 16.

Bulkhead panel 14 nearest to the vehicle or aircraft fuselage is preferably provided with a breakaway support 18 mounted along the edge of the bulkhead panel 14 adjacent to the aircraft or vehicle fuselage as shown in FIG. 1. The breakaway support 18 can be a shear pin, releasable clip or any other suitable structure capable of holding bulkhead panel 14 in an upright position during normal conditions and releasing the panel when sufficient force is exerted in a direction perpendicular to the surface of the bulkhead panel 14. A second breakaway support 20 is preferably provided between adjacent bulkhead panels 14 so that the bulkhead panel which is not adjacent to the vehicle fuselage will also be provided with lateral support.

Figure 3:
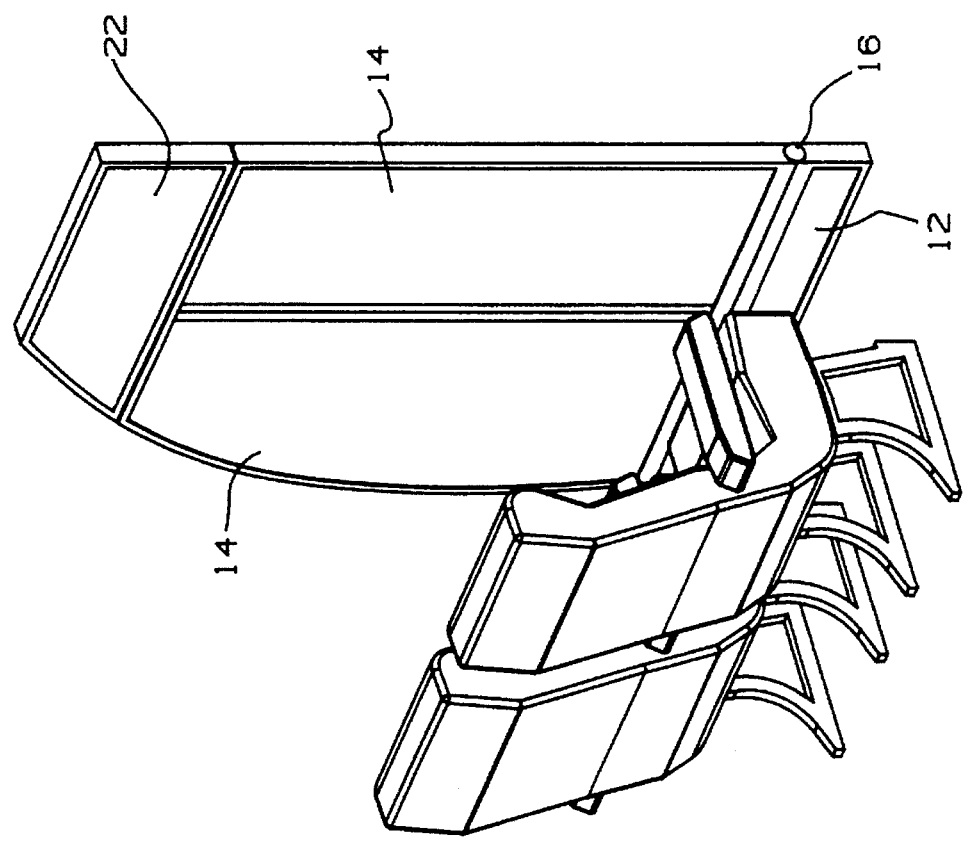
FIG. 3 is a perspective view of the first embodiment of the present invention shown with an auxiliary support bulkhead.

Alternatively, as shown in FIGS. 3 through 5, an auxiliary support bulkhead 22 can be provided which is preferably mounted to a rigid portion of the structure of the vehicle. Auxiliary support bulkhead 22 can be provided with breakaway supports 23 for bulkhead panels 14, as shown in FIG. 5. Breakaway supports 23 assist in holding each of the bulkhead panels 14 upright during normal conditions but allow them to separately pivot forward upon impact by a passenger under crash conditions. As explained with regard to breakaway supports 18 and 20, breakaway supports 23 may be shear pins, clips or any other suitable mechanism capable of maintaining bulkhead panels 14 in place during normal operating conditions and releasing them upon sufficient force being exerted on either panel 14.

Figure 6:
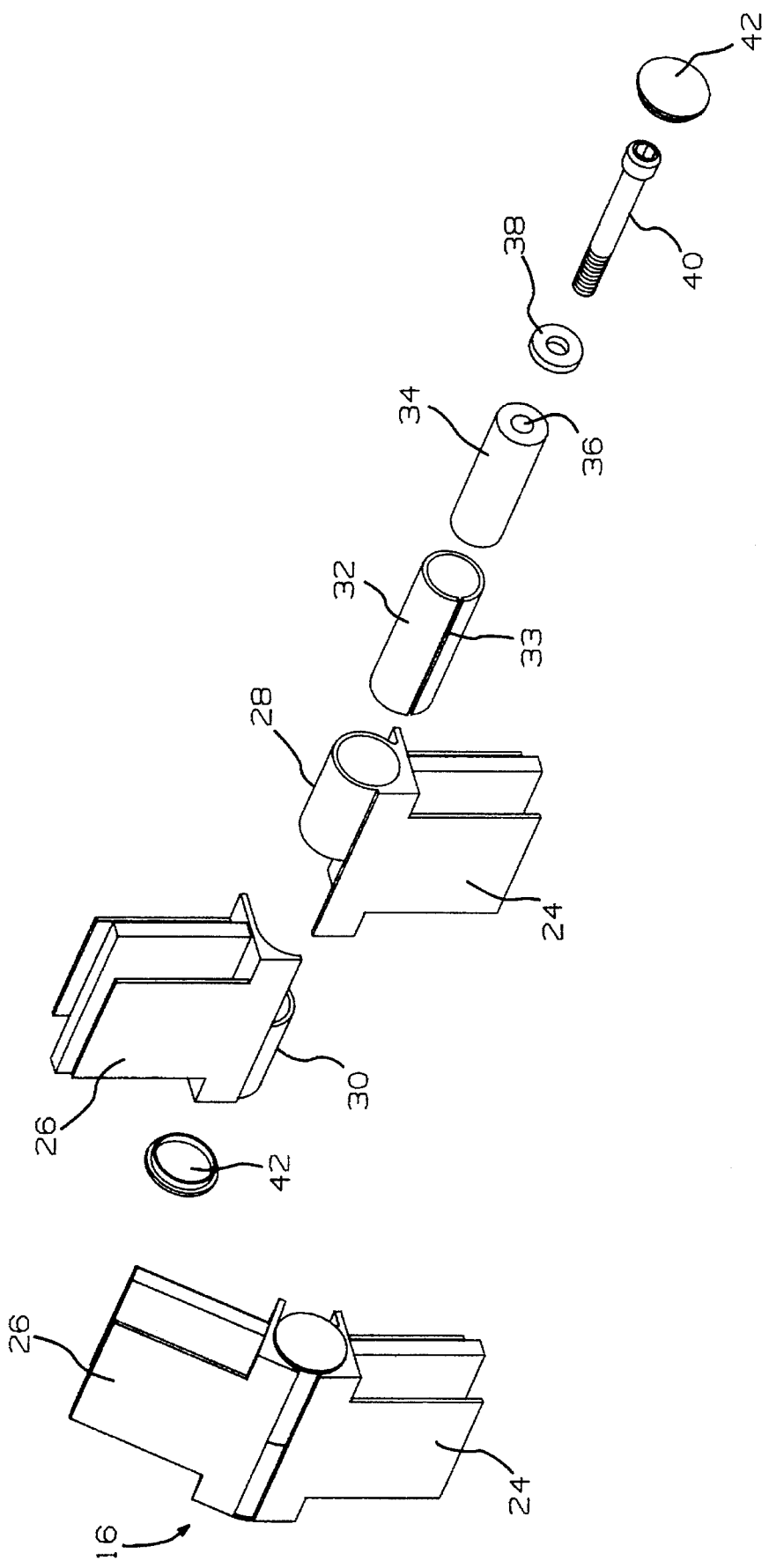
FIG. 6 is a perspective view of a pivot mechanism for use with the first embodiment of the present invention in assembled and exploded form.

Energy-absorbing pivot 16 can be formed from any suitable mechanism capable of simultaneously pivoting and absorbing an impact energy from bulkhead panels 14. FIGS. 6–8 show three possible alternative embodiments for achieving this result.

In the embodiment according to FIG. 6, energy-absorbing pivot 16 includes support mount 24 and panel mount 26. Support mount 24 may be mounted to bulkhead support base 12 or may be integrally formed therewith. Likewise, panel mount 26 may be mounted to bulkhead panel 14 or formed as an integral part thereof. In the embodiment according to FIG. 6, support mount 24 and panel mount 26 are joined along a pivot axis defined by cylindrically shaped hinge portions 28 and 30. Inserted within hinge portions 28 and 30 is a cylindrical sleeve 32 traversing substantially the entire length of hinge portions 28, 30, and a rubber bushing 34 mounted coaxially therein. Cylindrical sleeve 32 has a longitudinal gap 33 which extends along its entire length and permits cylindrical sleeve 32 to expand in circumference when rubber bushing 34 is longitudinally compressed. Axle bolt 40 passes through a central bore 36 of rubber bushing 34 and is threaded into an end face (not shown) mounted within hinge portion 30, opposite from where the annular end face of hinge portion 30 meets the annular end face of hinge portion 28. Tightening axle bolt 40 causes rubber bushing 34 to be longitudinally compressed and therefore expand within sleeve 32. In this manner, a frictional force between the outer surface of cylindrical sleeve 32 and the interior surface of hinge portions 28 and 30 is created. A slip washer 38 allows for relative rotation between the rubber bushing 34 and the head of bolt 40. End caps 42 are provided to seal the assembly.

Under crash conditions, an impact energy exerted on panel mount 26 by a bulkhead panel 14 will cause panel mount 26 to rotate with respect to support mount 24 and support base 12. Energy from such an impact will be absorbed by the energy-absorbing pivot 16 in the form of heat as a result of the friction created between the outer surface of cylindrical sleeve 32 and the interior surface of hinge portions 28 and 30. The degree of bolt-tightening torque exerted upon axle bolt 40 will determine the amount of force required to cause panel mount 26 to rotate with respect to support mount 24.

A second alternative embodiment of an energy-absorbing pivot is shown in FIG. 7. Various elements in FIG. 7 which are analogous to those in FIG. 6 are identified with the suffix "a". The energy-absorbing pivot 16a in FIG. 7 includes support mount 24a and panel mount 26a. As in FIG. 6, support mount 24a and panel mount 26a are joined along a pivot axis defined by cylindrical hinge portions 28a and 30a. Support mount 24a and panel mount 26a can be attached to bulkhead support base 12 and bulkhead panel 14 in the manner previously described with regard to FIG. 6. Inserted within hinge portions 28a and 30a is a cylindrically-wound torsion spring 44 having spring tabs 46 which can be formed from a bent end portion of the spring coil. Spring tabs 46 engage locking recesses 48 located on opposite annular end faces of hinge portions 28a and 30a. Inserted within spring 44 is a cylindrical bushing 50 which helps prevent torsion spring 44 from distorting under load conditions. End caps 42a can be provided to seal the energy-absorbing mechanism. In the energy-absorbing pivot of FIG. 7, an impact energy exerted on bulkhead panel 14 is resiliently absorbed by torsion spring 44 when bulkhead panel 14 pivots with respect to bulkhead support base 12.

A third alternative embodiment of the energy-absorbing pivot is shown in FIGS. 8A and 8B, wherein components which are analogous to those in FIGS. 6 and 7 are designated with the suffix "b". As previously explained with regard to FIGS. 6 and 7, support mount 24b and panel mount 26b may be mounted, respectively, on bulkhead support base 12 and bulkhead panel 14, or they may be integrally formed therewith.

As shown in FIGS. 8A and 8B, a friction washer 52 is inserted between hinge portions 28b and 30b so that it engages hinge washer faces 55 and 56. Axle bolt 40b is inserted through hinge washer faces 54, 55, 56, 57 and through friction washer 52. Axle bolt 40b engages threads formed between hinge washer faces 56 and 57 such that when bolt 40b is tightened, friction washer 52 engages washer faces 55 and 56. The frictional force created by friction washer 52 engaging hinge washer faces 55 and 56 resists rotation of the panel mount 26b with respect to support mount 24b. When panel mount 26b is caused to rotate with respect to support mount 24b, the torsional force causing such rotation is absorbed in the form of heat as a result of the frictional engagement of friction washer 52 with hinge washer plates 55 and 56.

As previously noted, panel mounts 26, 26a, 26b, and support mounts 24, 24a, 24b may be mounted to support base 12 and bulkhead panel 14, respectively, or may be integrally formed therewith. If the mounts are not integrally formed with the support base 12 and bulkhead panel 14, they may be connected thereto by any suitable means such as bolts, screws, clips, adhesive cement, etc.

Figure 9:
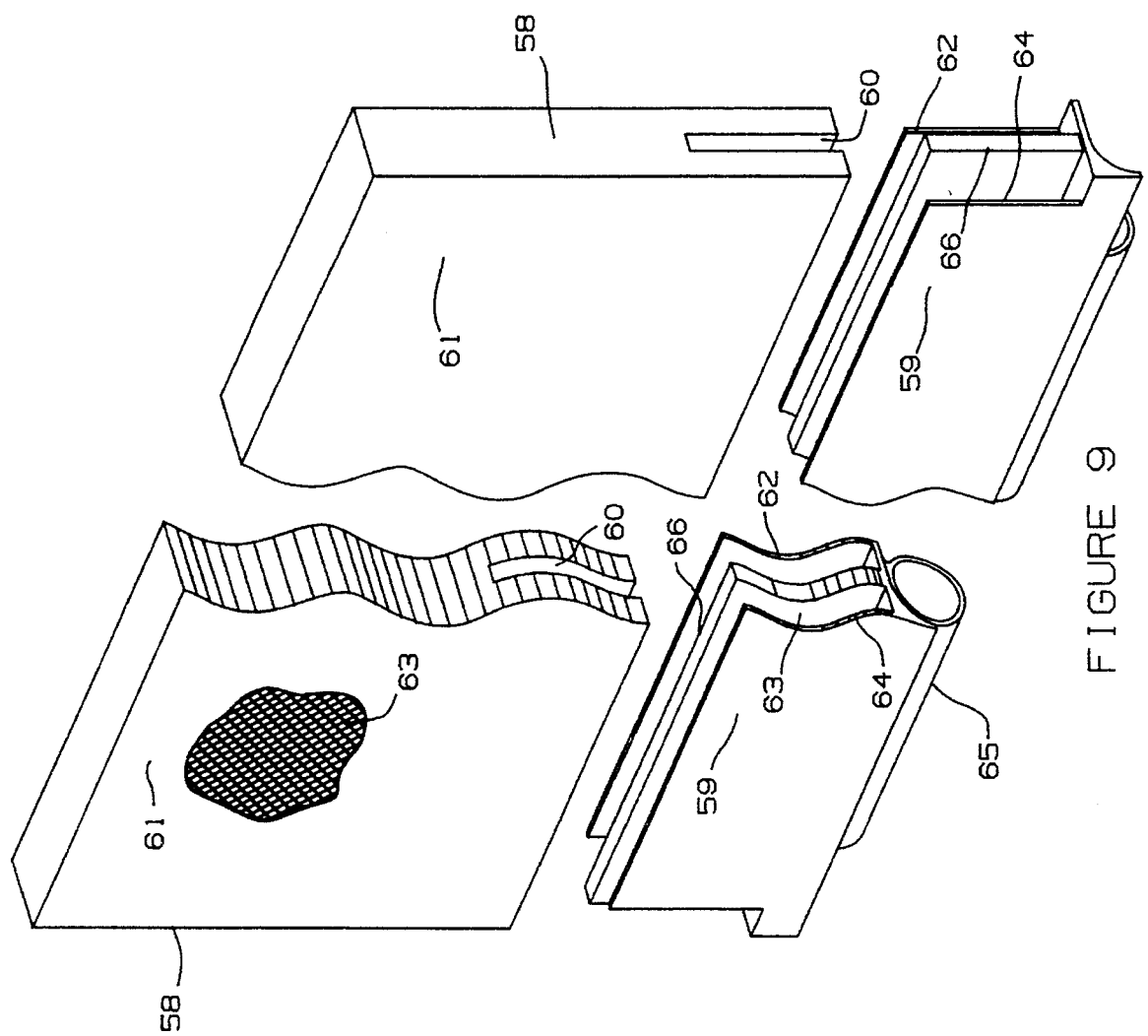
FIG. 9 is a perspective view showing a method for connecting a pivot mechanism to a bulkhead panel.
Figure 11:
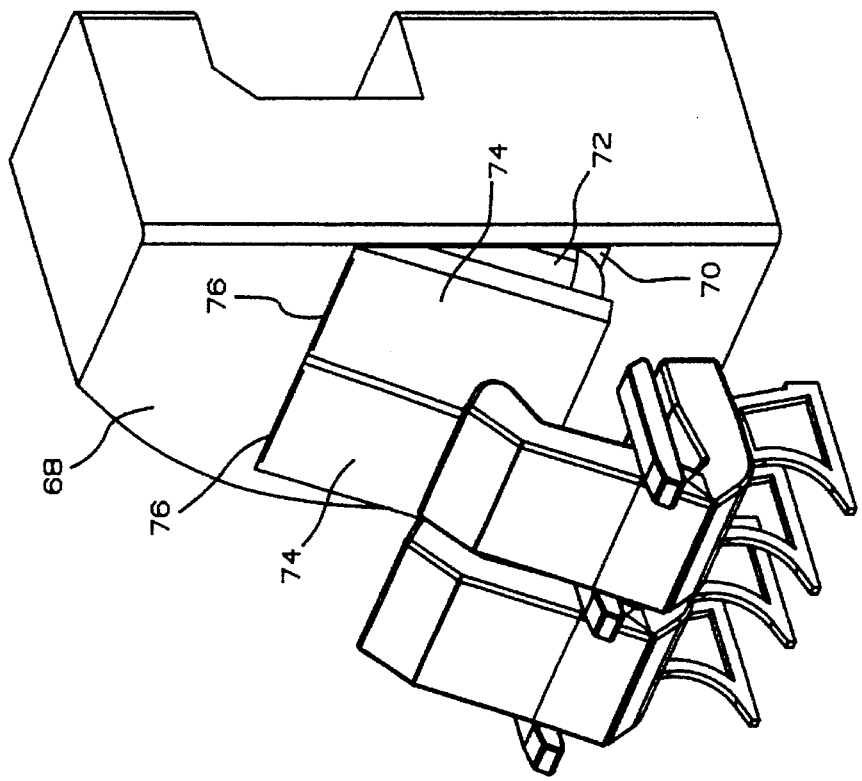
FIG. 11 is a perspective view of the second embodiment of the invention with the bulkhead panel pivoted.
Figure 10:
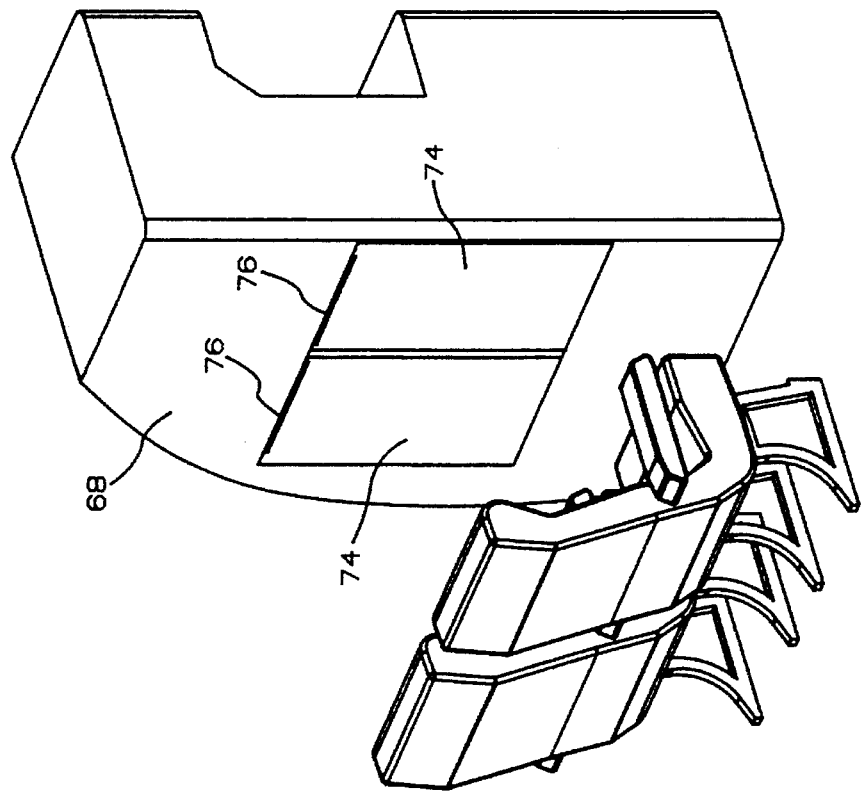
FIG. 10 is a perspective view of the second embodiment according to the invention positioned in front of a row of seats.
Figure 14:
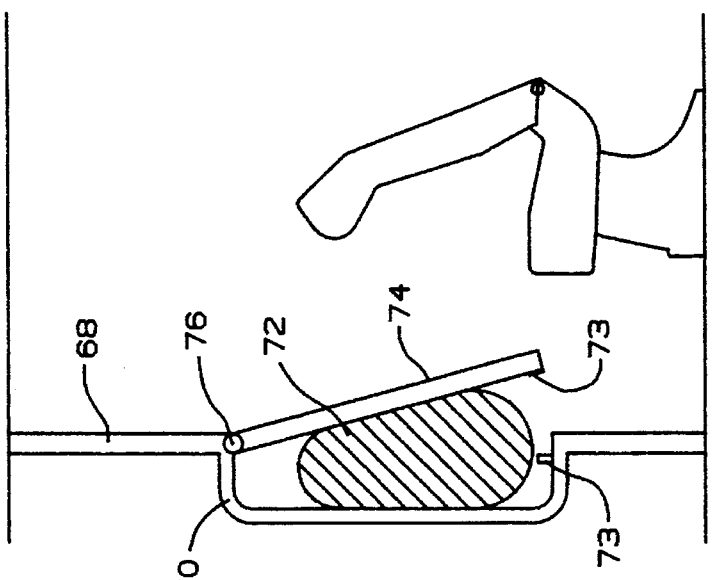
FIG. 14 is a side view of the second embodiment of the invention with the bulkhead panel fully pivoted.
Figure 13:
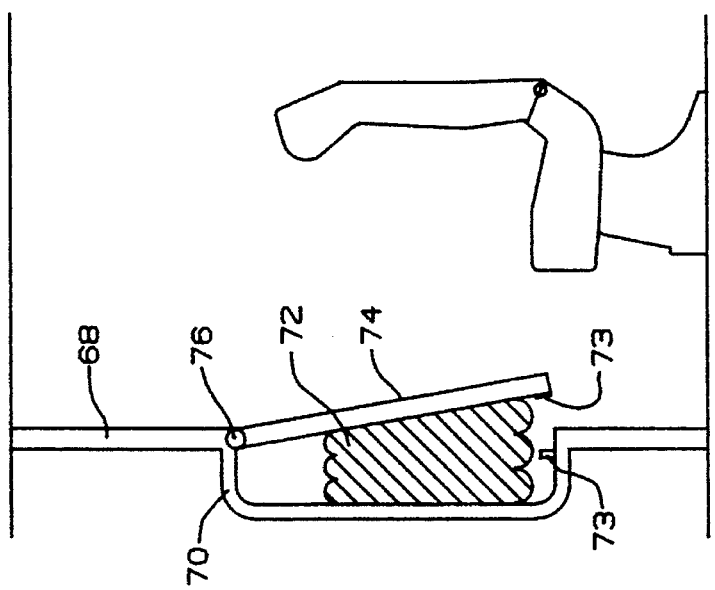
FIG. 13 is a side view of the second embodiment of the invention with the bulkhead panel partially pivoted.
Figure 12:
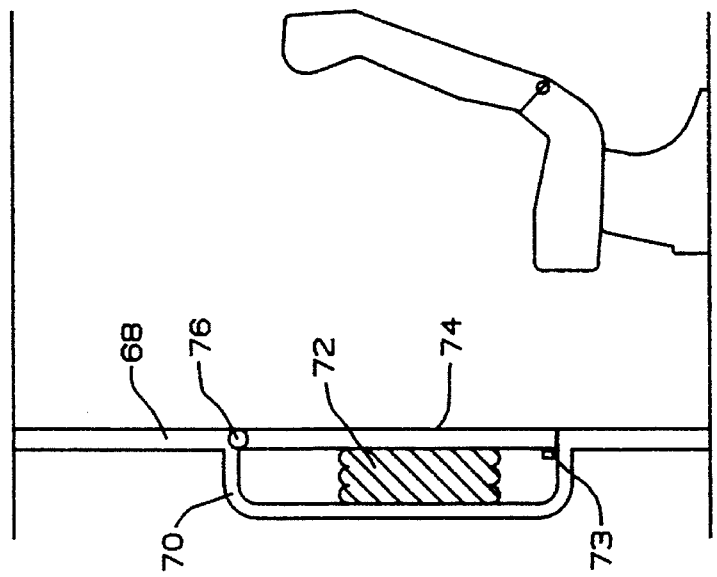
FIG. 12 is side view of the second embodiment of the invention under normal conditions.

FIG. 9 shows one possible method for joining panel mounts 26, 26a and 26b, and support mounts 24, 24a and 24b to a bulkhead panel 14 or support base 12 in a vehicle such as an aircraft. In aircraft, bulkheads are typically made from a strong but lightweight composite material 63 which has a skin formed on its outer surface 61. The composite material requires specialized methods for attaching hardware in order to avoid any structural weakening of the panel. FIG. 9 demonstrates one possible method for achieving this result.

As shown in FIG. 9, a panel mount 59 can be joined to a bulkhead unit 58 by providing a groove 60 along an edge of bulkhead unit 58 where panel mount 59 is to be attached. Groove 60 is formed roughly parallel to the outer surface 61 of bulkhead unit 58 and preferably extends the length of panel mount 59. The grooved end of bulkhead panel 58 is inserted in recesses in panel mount 59 defined by flanges 62, 64 and 66. Flanges 62, 64 and 66 are preferably oriented parallel to a radial direction with respect to an axis defined by a hinge portion 65 of panel mount 59. The flanges are spaced such that the grooved edge of bulkhead unit 58 fits closely within said recesses. A suitable adhesive is preferably applied to a lower portion of bulkhead 58 and to the recesses formed by flanges 62, 64 and 66 to secure the bulkhead panel permanently to panel mount 59. When panel mount 59 is attached to bulkhead panel 58 in this manner, the result will be a strong joint which does not significantly affect the structural integrity of the composite material from which bulkhead unit 58 is made.

According to a second embodiment of the invention shown in FIGS. 10 through 19, the bulkhead support base 68 may be a fixed wall in the vehicle having a recessed cavity 70, 70a, 70b into which an energy-absorbing means may be mounted. Bulkhead panels 74, 74a, 74b are pivotally mounted along an upper edge of said recessed cavity 70, 70a, 70b by means of a hinge 76, 76a, 76b such that under normal operating conditions, the surface of each bulkhead panel 74, 74a, 74b facing passenger seats remains substantially flush with the surface of bulkhead support base 68. A releasable latch 73, 73a, 73b is preferably provided to maintain bulkhead panel 74, 74a, 74b in this position under non-crash conditions. Latch 73, 73a, 73b can be a snap-on clip, magnetic lock, hook and loop fastener or any other suitable device capable of maintaining bulkhead panel 74, 74a, 74b in a closed position under normal operation conditions, and releasing said bulkhead panel when it is driven outwardly by mechanical means under crash conditions. In FIGS. 12–17, a hook and loop type latch is shown for engaging the inner surface of bulkhead panel 74, 74a, 74b.

The surface of bulkhead panels 74, 74a, 74b facing passenger seats is preferably formed of a compliant energy-absorbing material to minimize any injury to a passenger striking the panel. The material can be a rubberized plastic, foam padding or any other suitable material.

As shown in FIGS. 11–14, the energy-absorbing means can be an inflatable airbag 72 which, upon inflation, will cause bulkhead panel 74 to pivot outwardly. Upon impact of a passenger on outwardly-pivoted bulkhead panel 74, panel 74 will exert a compressive force upon airbag 72, thereby causing the gas contained therein to be expelled. In this manner, the impact energy is absorbed by the airbag 72, and panel 74 is simultaneously substantially returned to its original position so that the passenger exit path is not blocked. As noted above, the compliant surface of panel 74 also helps to absorb the impact energy.

Figure 15:
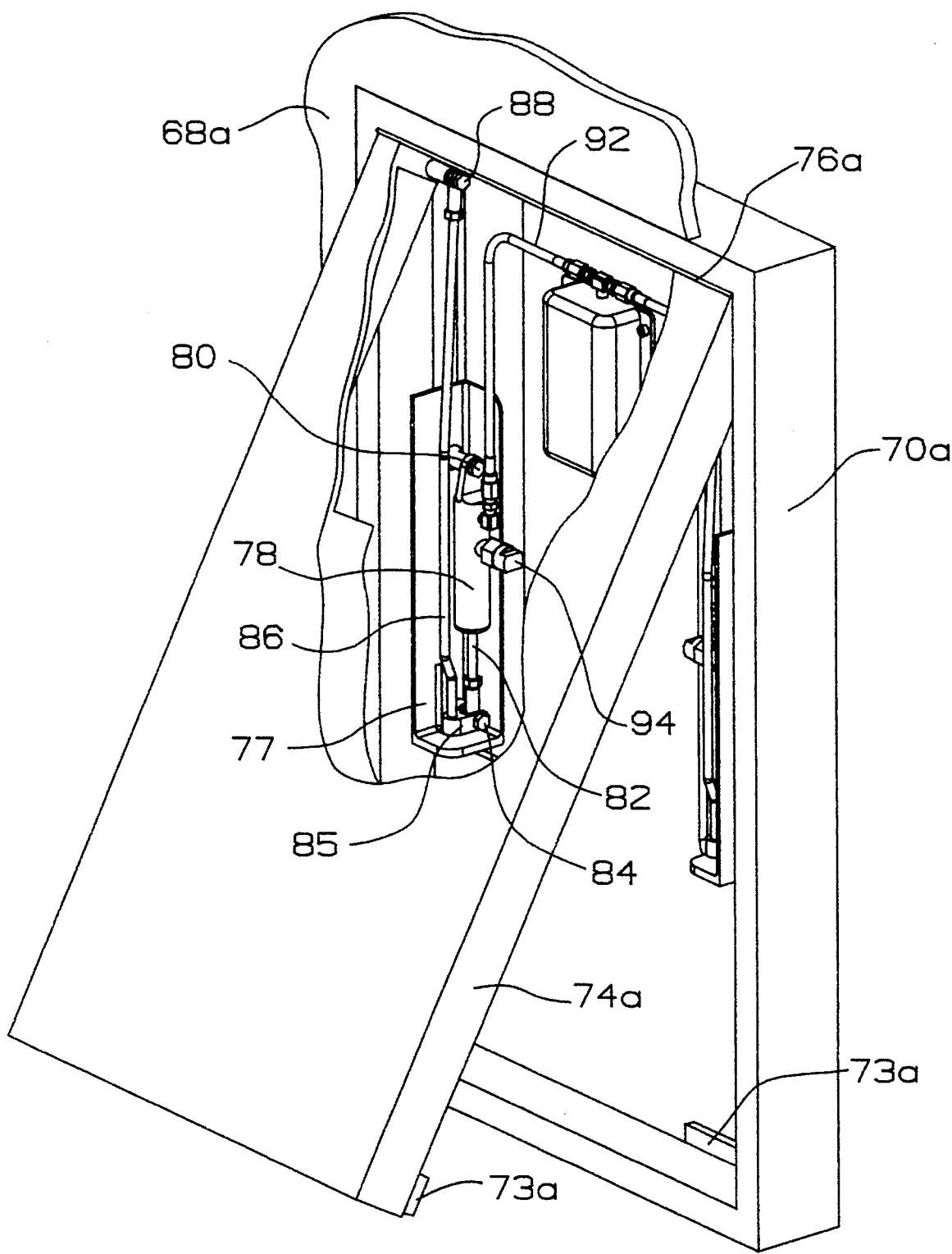
FIG. 15 is a perspective view of the second embodiment of the invention with a gas cylinder energy-absorbing mechanism.
Figure 16:
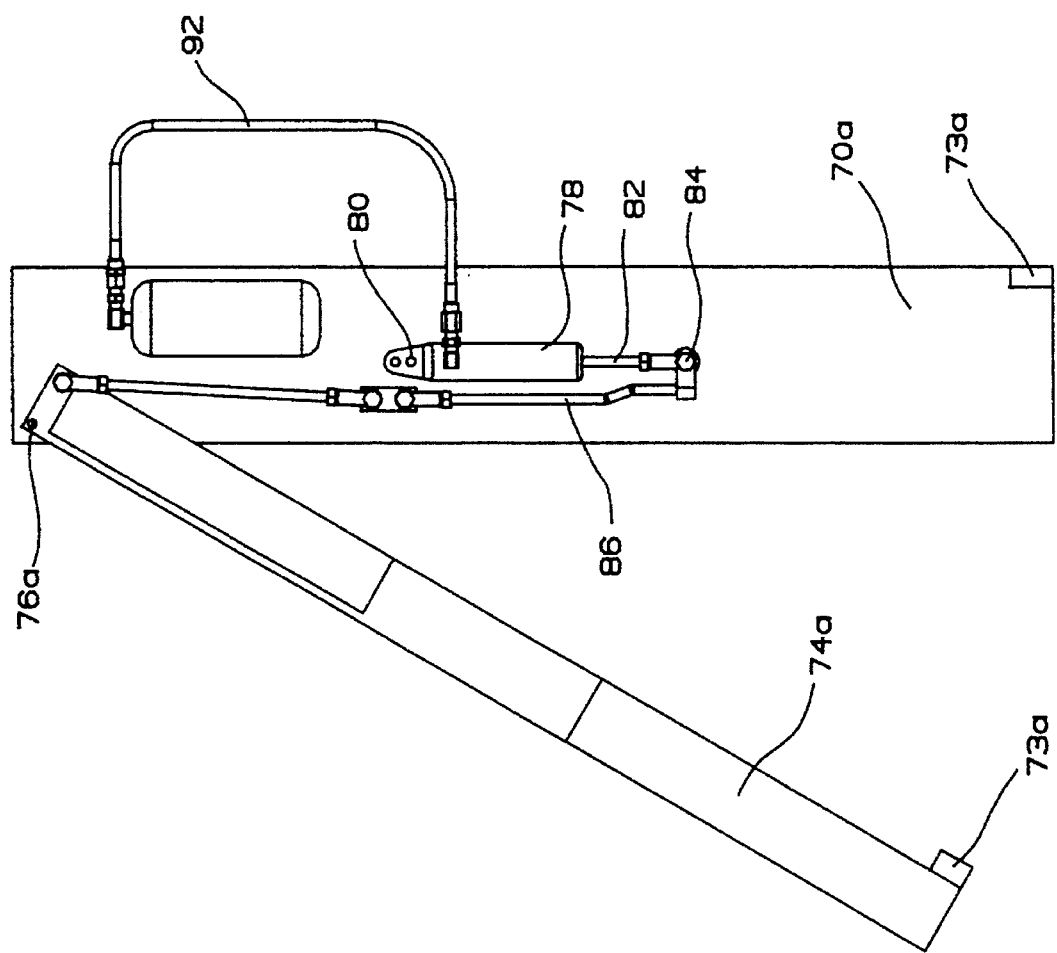
FIG. 16 is a side view of the second embodiment of the invention according to FIG. 15.

Airbag 72 represents one possible method for absorbing an impact energy in the device according to the present invention. However, any suitable energy-absorbing device may be used for this purpose. One example of an alternative energy-absorbing device which may be used in place of an inflatable airbag is shown in FIGS. 15 and 16. Components in FIGS. 15 and 16, which are analogous to those in FIGS. 10–14, are shown with the same reference numbers with the suffix "a" added.

In the embodiment according to FIG. 15, a recessed cavity 70a is provided with a pair of hydraulic or pneumatic cylinders 78 mounted therein. Only one cylinder is shown in FIG. 15 for the purpose of greater clarity. The second cylinder is mounted in cavity 70a directly opposite from, and in the same manner as, the cylinder 78 which is shown. The recessed cavity is fitted within a bulkhead support 68a similar to the manner shown in FIGS. 10–14, so that the outer surface of bulkhead panel 74a is essentially flush with the surface of the bulkhead support base. As shown in FIGS. 15 and 16, bulkhead panel 74a is attached to recessed cavity 70a by means of a hinge 76a attached to an upper edge of bulkhead panel 74a adjacent to its exterior surface. The hinge is preferably attached to recessed cavity 70a along an interior surface along an upper edge of said cavity, adjacent to the outer surface of bulkhead support base 68a.

Mounted within cavity 70a are cylinder housings 77 enclosing cylinders 78. An upper end of each of cylinders 78 is attached to the interior vertical walls of recessed cavity 70a by means of anchor bolts 80 attached to cylinder housing 77. Extending from a lower portion of cylinders 78 are piston rods 82. Piston rods 82 are attached by means of bolts 84 and connecting blocks 85 to extension rods 86. Extension rods 86 are profiled at a lower portion thereof so that the axis defined by an upper portion of each rod is spacedly offset from the axes defined by cylinders 78.

Extension rods 86 are pivotally attached to an upper portion of bulkhead panel 74a by means of pivot bolts 88. Pivot bolts 88 are mounted to bulkhead panel 74a, offset toward the interior of recessed cavity 70a. The offset, in this case, is necessary to permit a force exerted by extension rods 86 to generate sufficient torque to cause panel 74a to pivot on hinge 76a, thereby causing panel 74a to swing outwardly, away from its recessed cavity.

As noted above, cylinders 78 may be operated either hydraulically or pneumatically. If operated pneumatically, a source 75 of high-pressure gas is provided through conduits 92 for actuating piston rods 82. Alternatively, if cylinders 78 are hydraulically operated, conduits 92 can provide pressurized hydraulic fluid from source 75.

In the event of a crash, the safety system shown in FIGS. 15 and 16 is activated by a triggering mechanism which causes high-pressure gas or hydraulic fluid from source 75 to be supplied to cylinders 78. The high-pressure gas or hydraulic fluid causes piston rods 82 to be driven downwardly, out of cylinders 78. As a result, piston rods 82 will cause the attached extension rods 86 to also be driven in a downward direction. Since extension rods 86 are pivotally attached at their upper ends to bulkhead panel 74a and offset from hinge 76a, the torque generated by the downward movement will cause bulkhead panel 74a to swing outwardly in preparation for absorbing impact from a passenger thrown forwardly against it in a crash.

For the purpose of absorbing an impact energy, cylinders 78 can be provided with bleeder valves 94. When a passenger is thrown against bulkhead panel 74a, the force of impact will cause bulkhead panel 74a to pivot back towards its original position in recessed cavity 70a. This movement causes piston rods 82 to be driven into cylinders 78. When this occurs, bleeder valves 94 permit pressure built up in cylinders 78 to be relieved at a controlled rate. In this manner, cylinders 82 absorb the impact energy of the thrown passenger.

Figure 17:
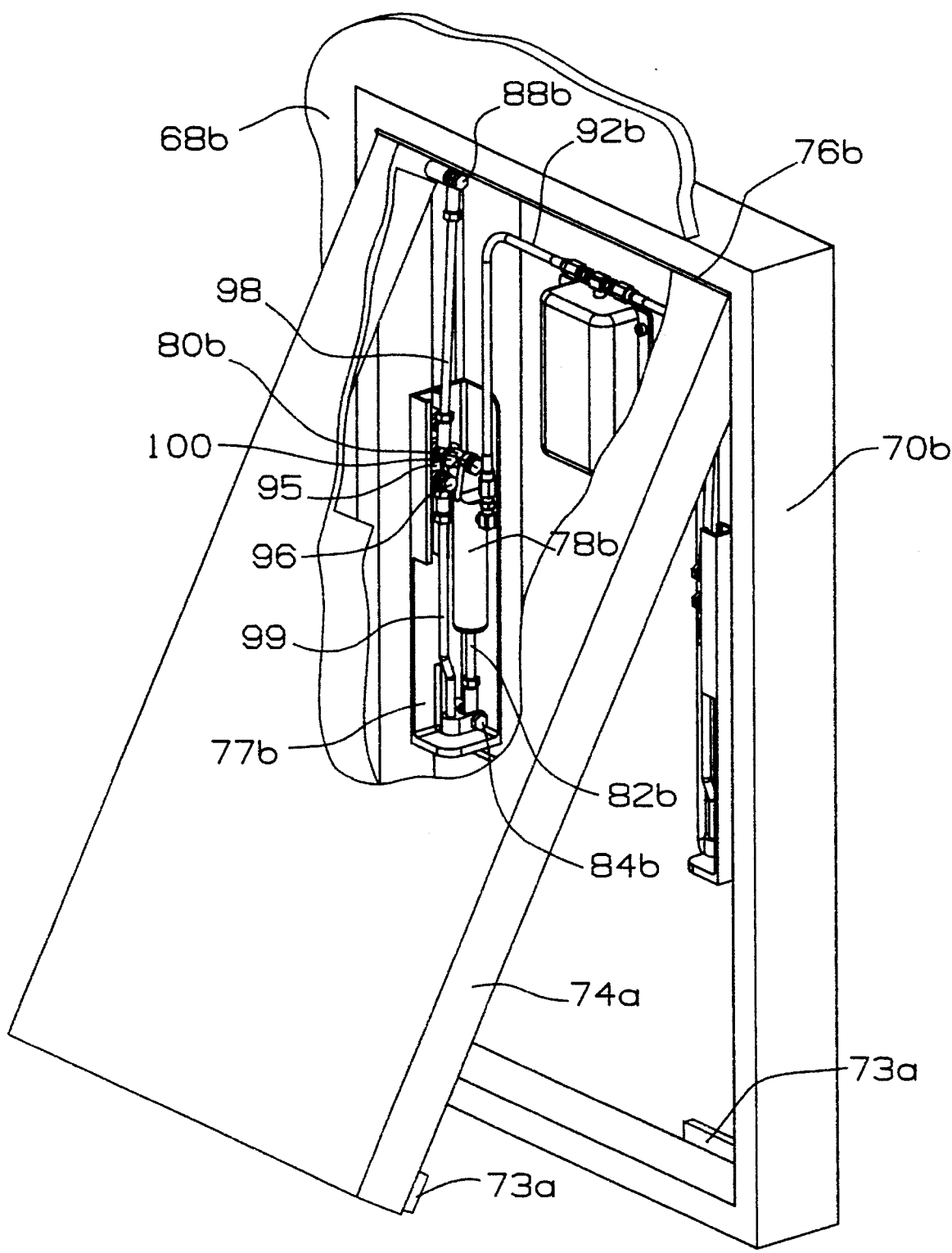
FIG. 17 is a perspective view of the second embodiment of the invention according to FIG. 15 with an alternative friction block energy-absorbing mechanism.
Figure 18:
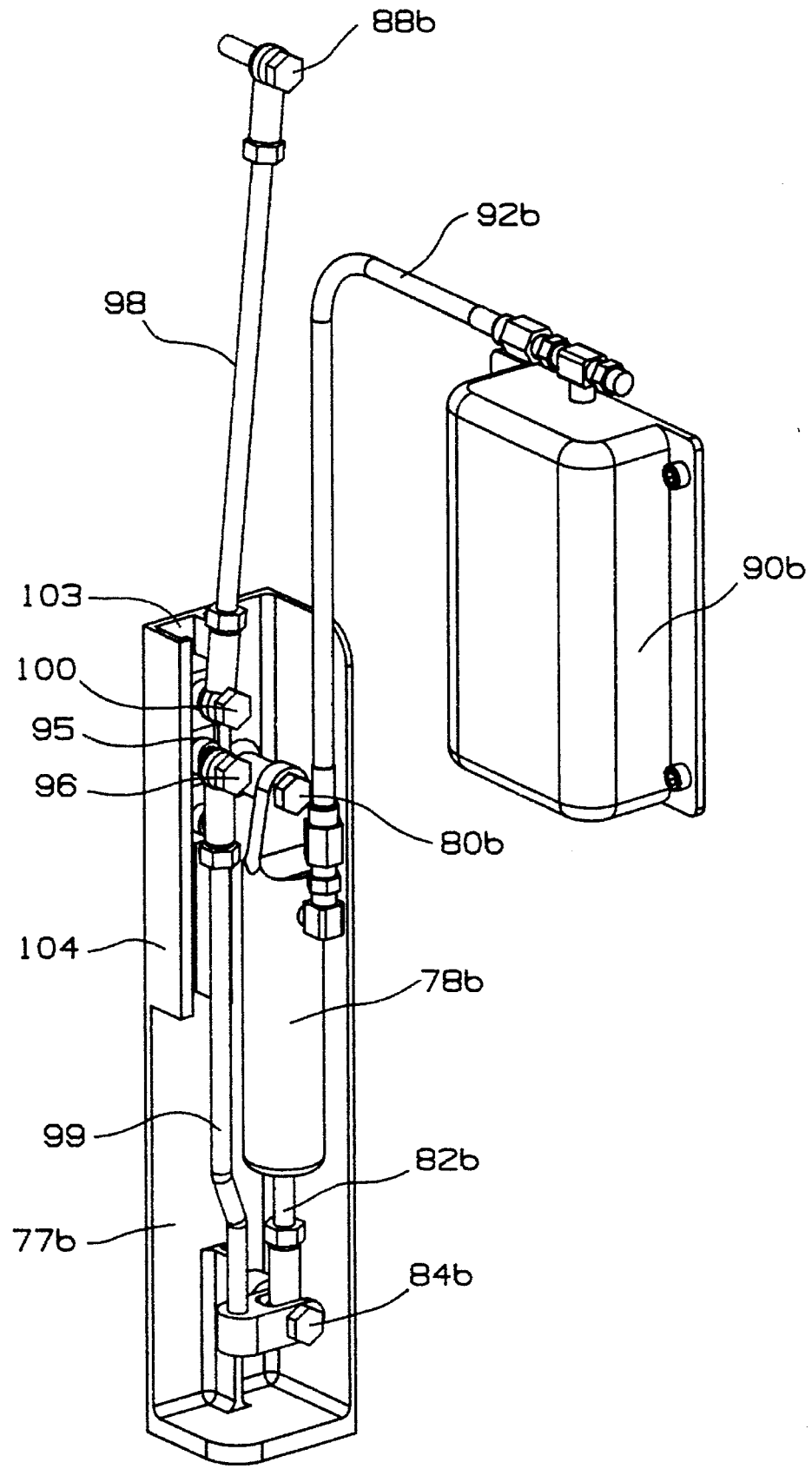
FIG. 18 is an enlarged view of a portion of the second embodiment of the invention shown in FIG. 17.

FIGS. 17 and 18 shows a third alternative energy-absorbing mechanism for use in the second embodiment of the present invention. Pistons 78b cause bulkhead panel 74b to pivot outwardly in a manner similar to that previously described with respect to FIGS. 15 and 16. Significantly, however, the energy-absorbing means is not comprised of bleeder valves. Instead, the force of impact of a passenger on bulkhead panel 74b is absorbed by friction linkages 95.

As shown in FIGS. 17 and 18, lower extension rods 99 can be attached to friction linkages 95 by means of connecting bolts 96. Upper extension rods 98 are preferably pivotally mounted to an upper portion of bulkhead panel 74b, offset from the exterior surface thereof. The lower ends of upper extension rods 98 are attached to friction linkages 95 by means of connecting bolts 100.

Friction linkages 95 are designed such that when piston 78b is activated, bulkhead panel 74b will be allowed to pivot outwardly with minimal resistance from friction linkages 95. However, when bulkhead panel 74b is driven back toward recessed cavity 70b, friction linkages 95 will resist such movement in an energy-absorbing manner. Friction linkages 95 can be formed from any suitable mechanical device capable of performing this function.

Figure 19B:
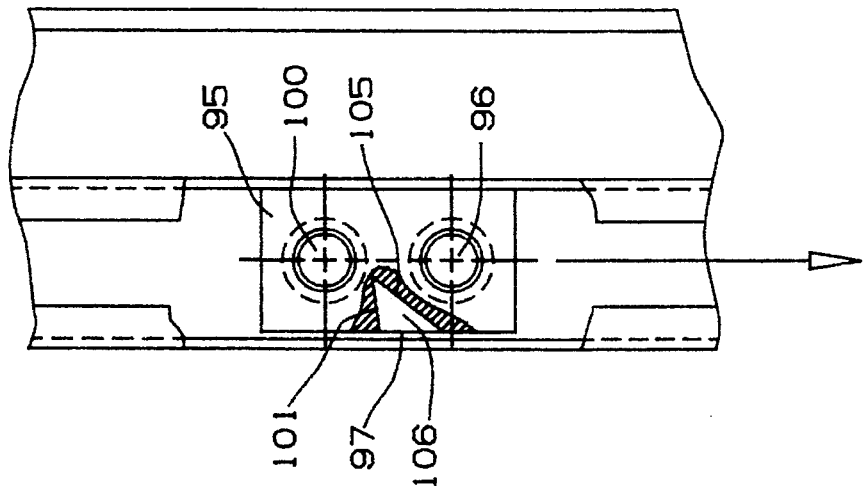
FIG. 19B is a cutaway front view of the alternative energy-absorbing mechanism of FIG. 17 with the friction block disengaged.
Figure 19A:
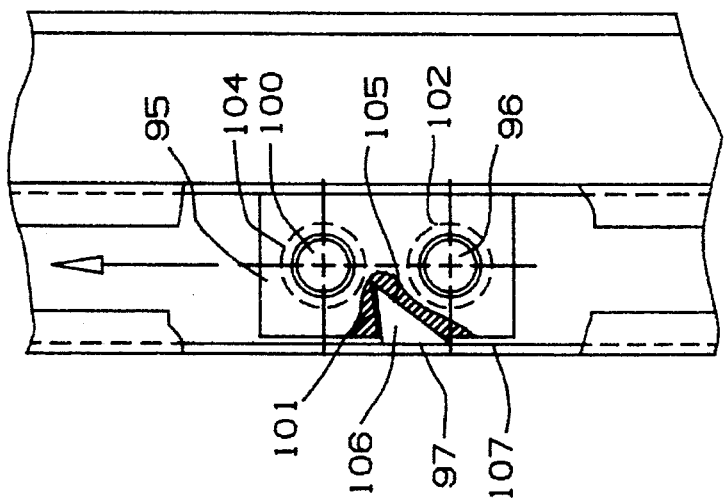
FIG. 19A is a cutaway front view of the alternative friction block energy-absorbing mechanism of FIG. 17 with the friction block engaged.
Figure 19C:
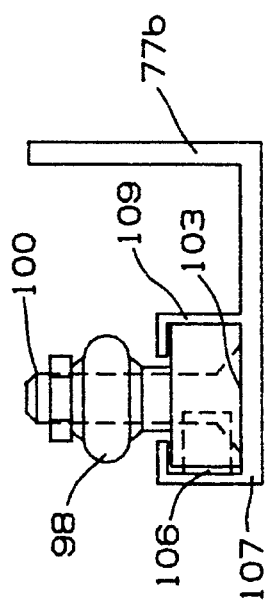
FIG. 19C is a top view of the alternative energy-absorbing mechanism of FIG. 17.

In a preferred embodiment shown in FIGS. 19A–19C, friction linkages 95 can be slidably mounted in a U-shaped channel 103 which is integrally formed with cylinder housing 77. Channel 103 is defined by channel walls 107 and 109, and is open along one side to accommodate the movement of connecting bolts 96, 100 when friction linkages 95 slides in said channel. As shown in FIG. 19A–C, friction linkages 95 are comprised of a link body 97 enclosing rollers 102 and 104 which are rotatably mounted on connecting bolts 96, 100. Rollers 102 and 104 are designed with sufficiently small diameters so that they do not contact channel walls 107 and 109. A wedge-shaped friction block 106 is positioned between rollers 102, 104 such that a ramp face 105 of friction block 106 is adjacent to roller 102 and an end face 101 extends substantially perpendicular to channel walls 107. A channel engagement face 97 of friction block 106 is positioned parallel and adjacent to channel wall 107 in an open side of friction linkage 95.

When cylinder 78b is activated causing piston rod 82b to be driven outwardly from said cylinder, end face 101 does not frictionally engage roller 104, and therefore friction block 106 is allowed to travel freely in channel with friction linkage 94, without drag. By comparison, when panel 74b is impacted by a passenger, and piston rod 82 is driven upwardly with respect to cylinder 78b, ramp 105 of friction block 106, in combination with the force of gravity, causes friction block 106 to be wedged between channel wall 107 and roller 102. This causes channel engagement face 97 to frictionally engage channel wall 107. The force of channel engagement face 97 upon channel wall 107 creates drag, and thereby absorbs an impact energy of a passenger thrown against panel 74a as the panel pivots closed.

Once the airbag, bleed valve or friction linkage has absorbed the impact energy of a passenger, bulkhead panel 74, 74a, 74b will be substantially in its original position, flush with the bulkhead support base 68, 68a, 68b. Clearance is thereby provided to allow passengers to exit the row of seats at which the safety system is mounted. Likewise, if the bulkhead happens to be positioned at an emergency exit, return of the bulkhead panel 74, 74a, 74b to its original position will allow clearance for the emergency exit to be used by other passengers.

A third alternative embodiment of the present invention is shown in FIGS. 20 through 22. According to this embodiment, a bulkhead support base 110 with a recessed cavity 112 is provided. Energy-absorbing means 114 is mounted within recessed cavity 112. A bulkhead panel 116 is slidably mounted on panel guides 118 within recessed cavity 112 and can be maintained in position by support 120. Support 120 is preferably designed such that it releasably latches bulkhead panel 116 in position flush with the surface of bulkhead support base 110 under non-crash conditions, and releases said bulkhead panel upon sufficient mechanical force being exerted in an outward direction. Panel guides 118 are designed such that upon activation of the device, bulkhead panel 116 can travel along panel guides 118 to a position parallel to and horizontally displaced from the surface of bulkhead support base 110.

In a preferred embodiment, the energy-absorbing means 114 is an airbag which, upon inflation, will cause support 120 to release bulkhead panel 116 and allow it to travel along panel guides 118 to its displaced position. Once again, however, any suitable energy-absorbing device may be provided for this purpose. If an airbag is not used as the energy-absorbing device, means must be provided which, upon activation of the system, will cause bulkhead panel 116 to slide outwardly, and upon impact, will allow it to return to a retracted position and remain there. As in the previously described embodiments, a pneumatically- or hydraulically-operated cylinder can be used for this purpose with a suitable energy-absorbing mechanism.

Bulkhead panel 116 is preferably at least partially formed from a compliant plastic material capable of minimizing injury to a passenger thrown forward in a crash. When the passenger strikes the bulkhead panel 116, the bulkhead panel will slide rearwardly toward the bulkhead support base 110, while at the same time, decelerating the movement of the passenger and absorbing much of the kinetic energy associated with such movement. If an airbag is used for the energy-absorbing means, the impact of the passenger will cause the airbag to at least partially deflate. The absorption of energy by the energy-absorbing means and the compliant plastic material of the bulkhead panel 116 will substantially reduce the risk of serious injury to a passenger.

Once the impact energy has been absorbed by the energy-absorbing means and bulkhead panel 116 has thereby been forced back toward the bulkhead support base 110, clearance is thereby provided to allow passengers to exit the row of seats immediately in front of the safety device. The bulkhead panel is preferably latched when it reaches this position by support 120.

The embodiment shown in FIGS. 20 through 22 is particularly useful for small commuter type aircraft in front of a seat which located on an aisle. Significantly, in small commuter aircraft where a passenger is seated on an opposite side of an aisle adjacent to or immediately aft of where a bulkhead panel is located, there is a possibility that such passenger will be thrown across the aisle and into the fixed bulkhead. This condition often tends to occur when a crash involves a substantial amount of yaw motion. In order to minimize injury to any passenger thrown across an aisle and into a bulkhead in this manner, the embodiment shown in FIGS. 20–22 is preferably utilized in the location shown in FIGS. 23–25. In this manner, bulkhead panel 116 can serve to partially absorb an impact energy from such a passenger while also protecting the passenger seated directly aft of the bulkhead panel.

Figure 25:
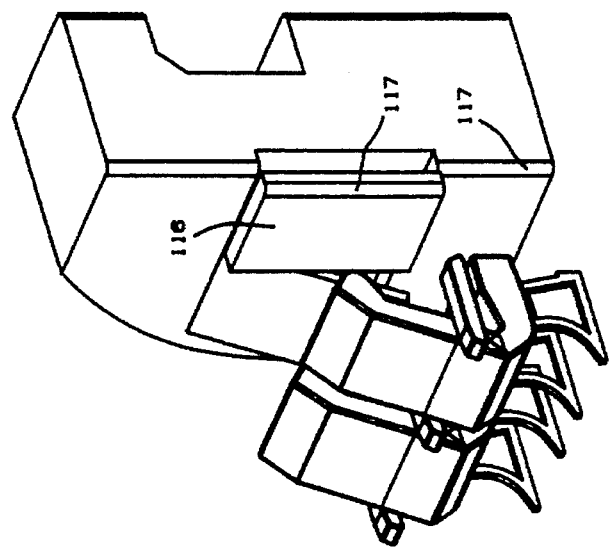
FIG. 25 shows the second and third embodiments of the invention with their bulkhead panels fully pivoted and extended, respectively.
Figure 24:
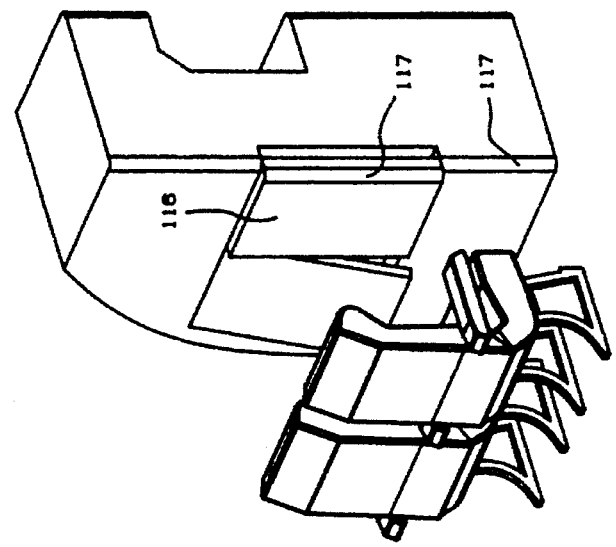
FIG. 24 shows the second and third embodiments of the invention with the bulkhead panels partly pivoted and extended, respectively.
Figure 23:
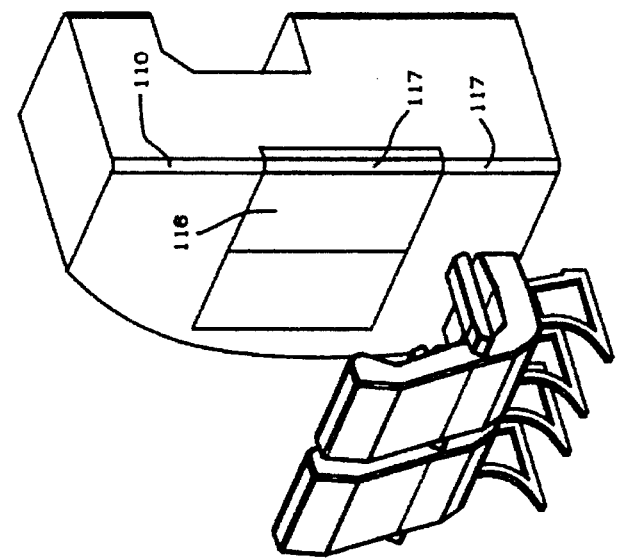
FIG. 23 shows the second and third embodiments of the invention mounted together in a bulkhead in front of a row of seats.

In FIGS. 23–25, the embodiment shown in FIGS. 20–22 is shown mounted in front of a seat adjacent to an aisle. When installed in this manner, bulkhead support base 110 and bulkhead panel 116 are preferably formed with a beveled edge 117 facing said aisle. If a crash occurs, panel 116 is activated in the manner previously described. Significantly, however, in the event that a passenger seated on an opposite side of an aisle from bulkhead panel 116 is thrown across said aisle in a crash, bulkhead panel 116 will not create a hazard in the form of sharp corners or edges.

As shown in FIGS. 23 through 25, the various embodiments of the present invention described above are preferably used in combination with one another to provide optimum safety for passengers seated in inside and outside rows behind a bulkhead.

In FIG. 26, a fourth alternative embodiment according to the present invention is disclosed. According to FIG. 26, the apparatus includes a bulkhead panel 122, which is preferably secured in a bulkhead support base 124 attached to a rigid portion of the frame of the vehicle. Bulkhead panel 122 is positioned directly in front of a passenger seat. Bulkhead panel 122 includes a rigid panel frame 126 and a panel skin 128 which is preferably formed of a compliant, energy-absorbing material. Enclosed within panel skin 128 is an energy-absorbing corrugated panel 130 securely attached along its upper and lower edges to panel frame 126 by means such as bolts 131.

When a passenger impacts upon bulkhead panel 122, the force of such impact causes the corrugations formed in corrugated panel 130 to deform and stretch in a direction away from the passenger. The deformation and stretching of bulkhead panel 122 are shown in FIG. 26C. The combination of the panel skin 128 and the corrugated panel 130 absorb a passenger impact energy and serve to reduce any possible injury to the passenger impacting upon the bulkhead panel 122.

In an alternative embodiment to that shown in FIGS. 26A–26C, an entire wall such as an airliner class-divider bulkhead can be formed in the manner described with respect to bulkhead panel 122. In such cases, the class-divider bulkhead may be directly attached to the floor structure and fuselage of the airliner.

Corrugated panel 130 can be formed of any suitable material capable of being shaped in a corrugated manner and deforming upon impact by a passenger. For example, the corrugated panel could be formed from light gauge sheet metal or from deformable plastic materials. In any event, the thickness of the material and the shape of the corrugations can be adjusted to achieve a panel, which includes the proper combination of structural rigidity and energy-absorbing characteristics. If bulkhead panel 122 is mounted in a bulkhead support base 124, a recessed cavity 129 is preferably provided behind the bulkhead panel to provide room for it to deform under crash conditions.

Figure 27B:
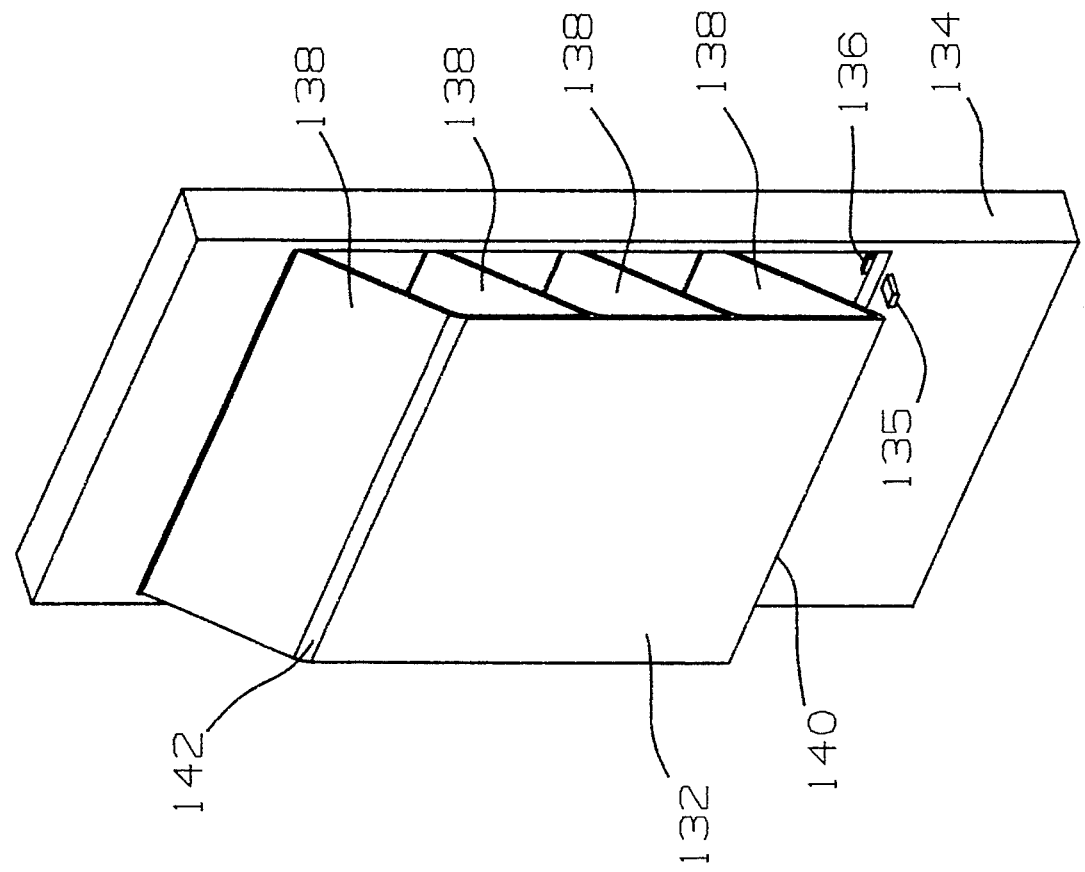
FIGS. 27A and 27B show a fifth embodiment of the present invention in stored and deployed positions, respectively.
Figure 27A:
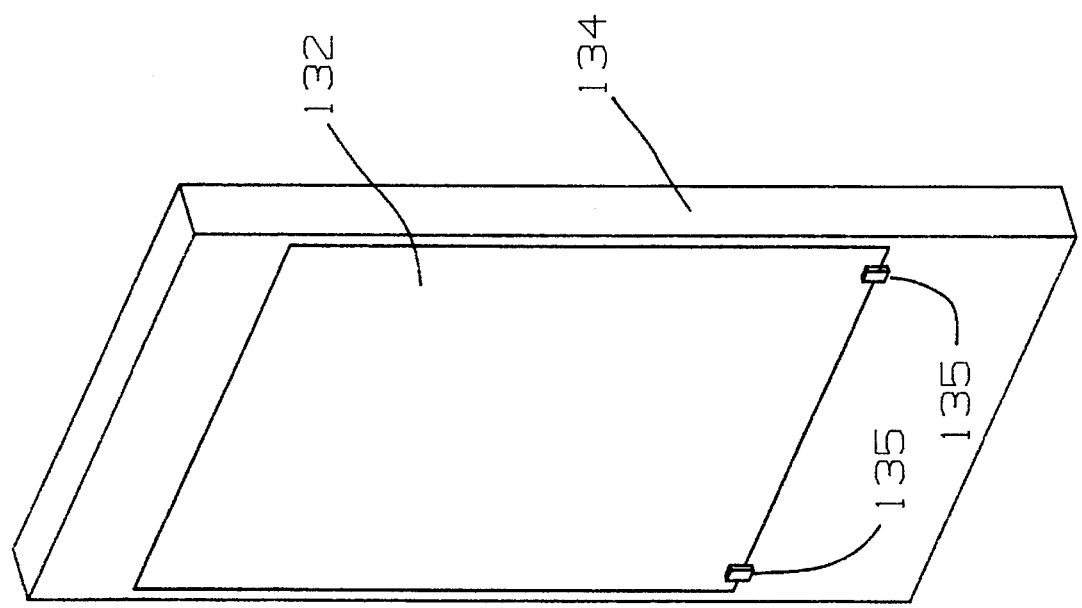

A fifth alternative embodiment of the present invention is shown in FIGS. 27A and 27B. As shown in FIGS. 27A and 27B, a bulkhead panel 132 is preferably mounted in a recessed cavity 136 formed in bulkhead support base 134. Alternatively, the bulkhead panel 132 could be mounted to bulkhead support base without any recessed cavity. Bulkhead panel 132 can include a series of spring panels 138 integrally formed on an inner surface of bulkhead panel 132 facing bulkhead support base 134. Spring panels 138 are preferably resiliently joined to bulkhead panel 132 parallel to upper and lower bulkhead panel edges 140, 142. At an opposite edge of spring panels 138 from where they are joined to bulkhead panel 132, they are pivotally mounted to the interior of recessed cavity 136.

Spring panels 138 can be spaced apart from one another along the inner surface of bulkhead panel 132, to facilitate being folded flat against the inner surface of bulkhead panel 132 without interference from adjacent spring panels. In a preferred embodiment, spring panels 138 are spaced apart along the inner surface of bulkhead panel 132 at a distance equal to the distance said spring panels extend from the surface of bulkhead panel 132. When formed in this manner, each resiliently-formed spring panel 138 can easily be folded flat against the inner surface of bulkhead panel 132 without engaging the next higher spring panel 138.

Under normal conditions, bulkhead panel 132 is secured in a substantially flat position relative to the surface of bulkhead support base 134. Bulkhead panel 132 can be maintained in this position by means such as latch mechanism 135. Latch mechanism 135 can be comprised of any suitable mechanical device capable of maintaining bulkhead panel 132 in its flat position relative to support base 134 under normal conditions, releasing said bulkhead panel when a crash occurs, and relatching said bulkhead panel when it is returned to its flat position after impact by a passenger.

In the event of a crash, a triggering device causes latch mechanism 135 to release bulkhead panel 132. When this occurs, spring panels 138, which are resiliently-joined to the inner surface of bulkhead panel 132, cause bulkhead panel 132 to spring outwardly from the surface of bulkhead support base 134. The resilient joint between spring panels 138 and bulkhead panel 132 causes this outward movement to occur. Once in this outwardly pivoted condition, bulkhead panel 132 forms a surface capable of absorbing an impact energy from a passenger thrown against said panel in the event of a crash. The impact energy, in this case, being absorbed by resiliently-attached spring panels 138. When a passenger impacts upon bulkhead panel 132, the panel collapses inwardly towards recessed cavity 136, and is then re-latched in that position by latch mechanism 135.

FIGS. 28A and 28B disclose a sixth alternative embodiment according to the present invention. As shown in FIGS. 28A and 28B, the invention includes a bulkhead support base 144 and a bulkhead panel 146. Under normal conditions, the outer surface of bulkhead panel 146 is preferably positioned substantially flush with the surface of bulkhead support base 144 in a recessed cavity 148. Recessed cavity 148 includes vertically-oriented panel guide tracks 152, spaced apart from one another along an interior surface of recessed cavity 148. Panel guide tracks 152 include a plurality of panel ratchet grooves 154 vertically spaced along the length thereof. Mounted along a lower edge of recessed cavity 148 are latches 150 for engaging latch engagement means 156 formed on, or mounted to, a lower edge of bulkhead panel 146.

Flexible bulkhead panel 146 is preferably formed from a flexible, resilient plastic material which, in its natural state, is arcuately shaped as shown in FIG. 28B. Under normal conditions, bulkhead panel 146 is stretched flat as shown in FIG. 28A so that its surface is flush to that of bulkhead support base 144. The bulkhead panel 146 can be maintained in this position by means of latches 150 and latch engagement means 156. Bulkhead panel 146 is preferably attached along its upper edge to bulkhead support base 144 by means of a panel hinge 158.

When the safety system according to FIGS. 28A and 28B is activated by means of a suitable triggering mechanism, latches 150 disengage from latch engagement means 156. When this occurs, the resiliently flexible bulkhead panel will spring back toward its natural arcuate shape. This spring action will cause an upper edge of bulkhead panel 146 to pivot with respect to bulkhead support base 144 on hinge 158. As bulkhead panel 146 approaches its natural arcuate shape, the lower edge of said bulkhead panel will engage panel ratchet grooves 154 as it travels upwardly along panel guide tracks 152. Once engaged in grooves 154, the lower edge of bulkhead panel 146 will thereafter be prevented from sliding back toward its original flat position adjacent to the surface of bulkhead support base 144. After this has occurred, bulkhead panel 146 is ready to absorb an impact energy of a passenger thrown against said panel.

In the event of a crash, the impact energy of a passenger thrown forward against bulkhead panel 146 will be resiliently absorbed by flexible bulkhead panel 146, as a result of plastic deformation of the panel. The degree of energy absorption provided by said panel can be chosen by altering the thickness and stiffness of the material from which bulkhead panel 146 is formed.

Numerous variations are possible with regard to the invention shown in FIGS. 28A and 28B. For example, rather than engaging grooves 154, the bottom edge of bulkhead panel 146 can be slidable up and down panel guide tracks 152. If arranged in this manner, a substantial part of the energy-absorbing resistance will come from the elastic deformation of the panel, rather than simply a plastic deformation which results when the lower edge of the bulkhead panel 146 is prevented from sliding downward.

Figure 30:
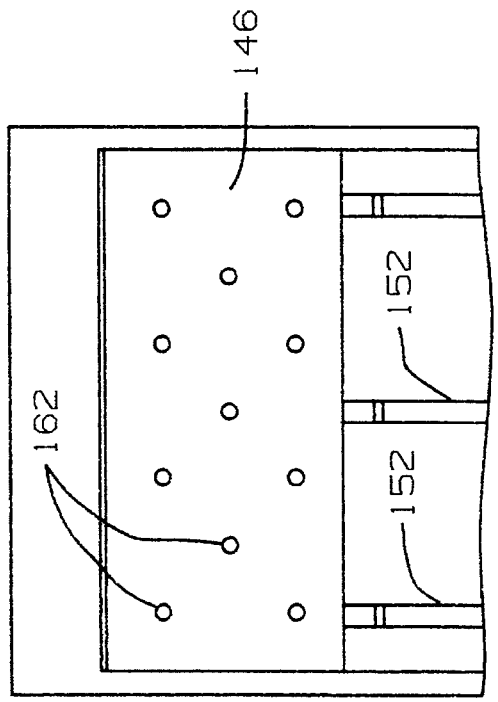
FIG. 30 is a front view of a second alternative bulkhead panel for use with sixth embodiment of the invention shown in FIGS. 28A and 28B.
Figure 29:
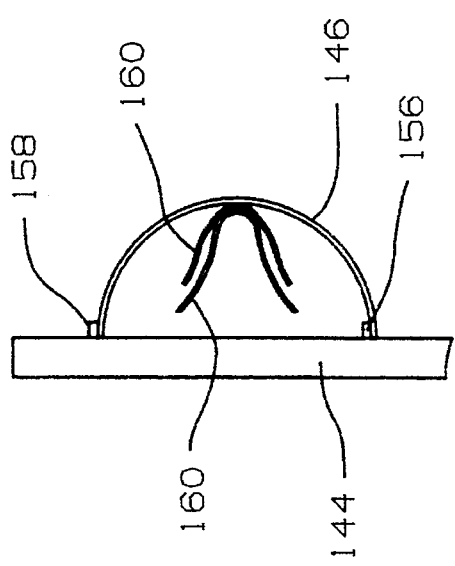
FIG. 29 is a side view of an alternative bulkhead panel for use with the sixth embodiment of the invention shown in FIGS. 28A and 28B.

Many other alternatives are also available for adjusting the stiffness and elasticity of bulkhead panel 146 to absorb an impact energy. For example, as shown in FIG. 29, flexible bulkhead panel 146 may have attached to its inner surface, one or more leaf springs 160. Leaf springs 160 lie flat against bulkhead support base 144 when bulkhead panel 146 is in its normal, latched position, and provide additional energy-absorbing resiliency when bulkhead panel 146 is in its deployed position. Alternatively, as shown in FIG. 30, the stiffness of bulkhead panel 146 can be adjusted by selectively including cut-outs or punched holes 162 in the surface of bulkhead panel 146. The relative placement of such cut-outs or punched holes on the panel, as well as their size, can be used to control the stiffness and elasticity of the bulkhead panel for absorbing an impact energy.

Figure 31:
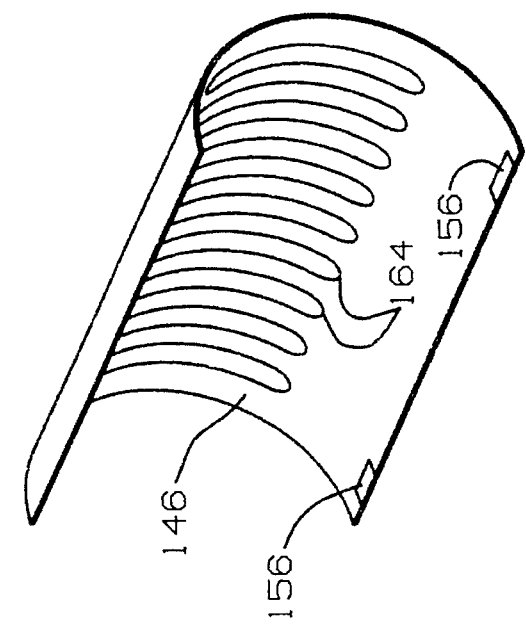
FIG. 31 is a perspective view of a rear surface of a third alternative bulkhead panel for use with the sixth embodiment of the invention shown in FIGS. 28A and 28B.

FIG. 31 shows a further alternative embodiment for controlling the relative elasticity of bulkhead panel 146. As shown in FIG. 31, bulkhead panel 146 can include rib members 164 which can be either attached to the surface of bulkhead panel 146 or embedded in the material from which it is formed.

Figure 32:
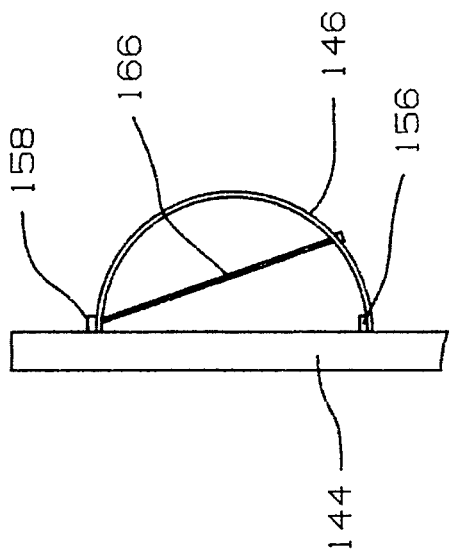
FIG. 32 is a side view of a bulkhead panel for use with the sixth embodiment of the invention according to FIGS. 28A and 28B with a deployment aid.

FIG. 32 shows the above-described invention fitted with an elastic member 166 to aid in the deployment of bulkhead panel 146. As shown in FIG. 32, the elastic member 166 is preferably anchored to an upper edge of bulkhead panel 146 or to an upper portion of recessed cavity 148. Elastic member 166 may be formed from an elastic string, a rubber web or any other suitable elastic element capable of assisting bulkhead panel 146 in achieving its natural arcuate shape.

In a seventh alternative embodiment according to the present invention shown in FIGS. 33–36, the flexible bulkhead panel may be comprised of inner spring panel 168 and outer spring panel 170. Inner spring panel 168 is pivotally mounted along its upper edge by means of hinge 169 to bulkhead support base 174. Outer spring panel 170 is pivotally mounted along its lower edge by means of hinges 171 slidably mounted on sliders 173. Hinges 171 include tongue portions which engage in ratchet grooves 175. The effect of the tongue portions engaging the ratchet grooves 175 is to permit hinges 171 to slide downwardly on sliders 173 when the spring panels are impacted and, thereafter, preventing said hinges 171 from sliding upwardly to their original positions. The operation of the spring panels and sliders is shown in FIGS. 34A–34C. The tongue portions and ratchet grooves provide one possible means for latching hinges 171 in their lowered position. Significantly, however, the invention is not so limited. Any suitable mechanism can be used for latching hinges 171 in the manner described.

Figures 33A, 33B:
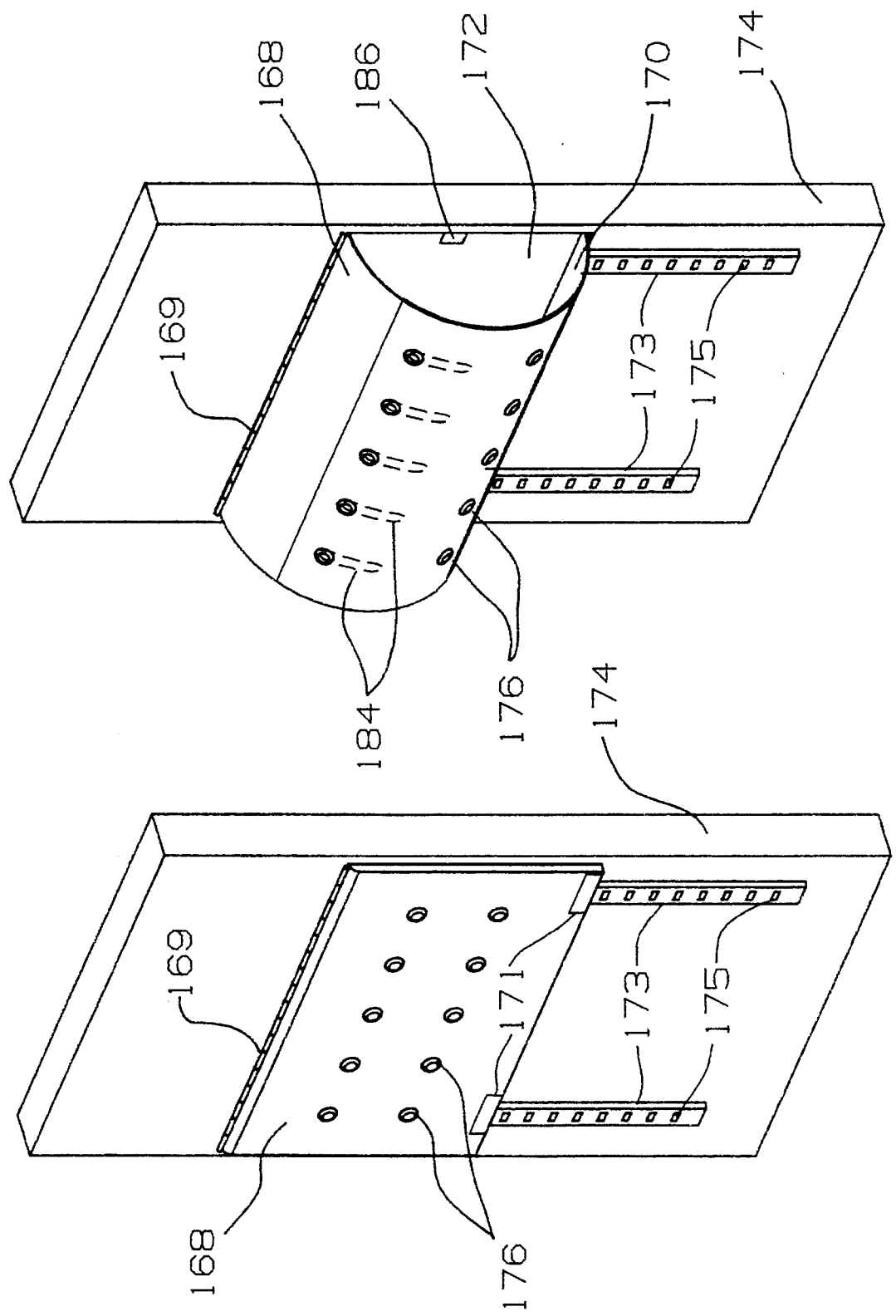
FIGS. 33A and 33B show a perspective view of a seventh embodiment according to the present invention in stored and deployed position, respectively.
Figure 35:
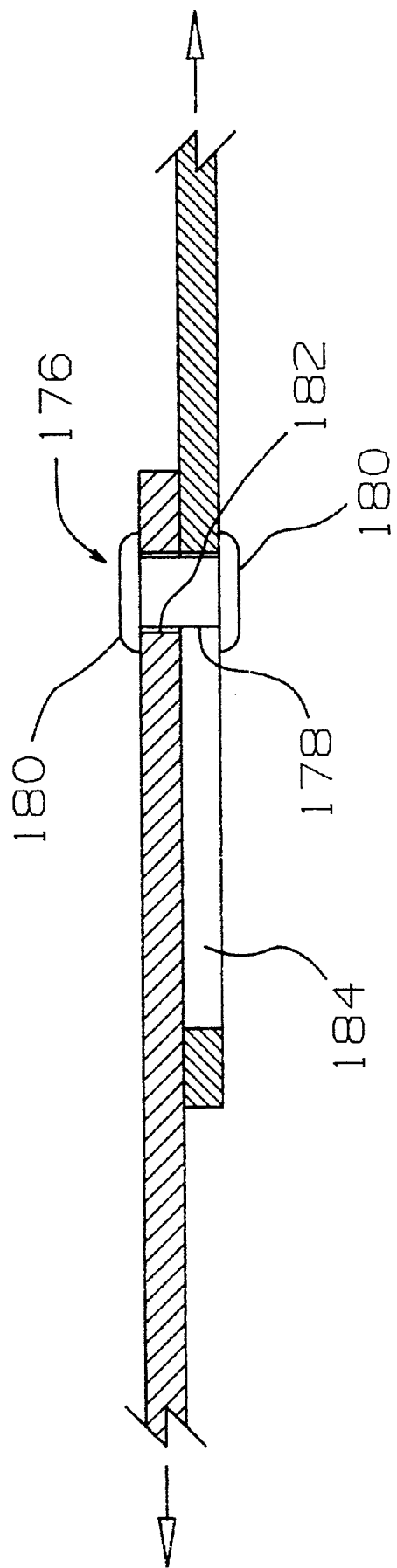
FIG. 35 is a cutaway side view of a bulkhead panel according to FIGS. 33 and 34.

Outer spring panel 170 and inner spring panel 168 are arcuately resilient and, in their natural state, these panels will form an arcuate shape as shown in FIGS. 33B and 34B. Outer spring panel 170 and inner spring panel 168 are preferably slidably mounted adjacent to one another by means such as mushroom connectors 176. As shown in FIG. 35, mushroom connectors 176 have a shaft portion 178 and head portion 180. Shaft portion 178 of mushroom connectors 176 passes through shaft apertures 182 and guide slots 184 formed in spring panels 170, 168. In FIG. 33B, guide slots 184 are vertically oriented with respect to spring panels 168, 170, and allow relative sliding movement between said spring panels as shown in FIGS. 33, 34 and 35. Mushroom connectors 176 provide one method of slidably joining spring panels 168, 170. Significantly, however, the invention is not so limited. Any suitable means for slidably joining spring panels 168, 170 may be used for this purpose.

Under normal operating conditions, outer spring panel 168 and inner spring panel 170 are secured in a flat position relative to bulkhead support base 174 by releasable latching clips 186 which can be located on the bulkhead support base. Latching clips 186 may be comprised of any suitable mechanical, electro-mechanical or pneumatic-mechanical device capable of maintaining the spring panels in a flat position under normal conditions and releasing them under crash conditions.

When a crash occurs, a triggering mechanism causes latching clips 186 to release spring panels 168, 170, thus causing them to spring outwardly to their natural arcuate shape as shown in FIG. 33B and 34B. In springing outwardly toward this position, the spring panels 168 and 170 are permitted to slide relative to one another by means of mushroom connector shaft portions 178 travelling in guide slots 184. Once in their outwardly-sprung position, inner spring panel 168 and outer spring panel 170 form an impact surface for absorbing an impact energy of a thrown passenger.

Upon impact of a passenger on spring panels 168, 170, hinges 171 are caused to slide downwardly on sliders 173 as the panels resiliently compress under load conditions. As the panels move to their more flattened positions, they absorb the impact energy of the passenger by means of plastic and elastic deformation. When the panels have fully absorbed the impact energy, the lower edge of spring panel 170 will remain latched in its lower position shown in FIG. 34C by means of the hinge tongue portions engaging ratchet grooves 175. In this manner, the panels will be maintained in its more flattened position, and will be prevented from interfering with the movement of passengers as they exit the vehicle after a crash.

One significant advantage of the embodiment of the invention shown in FIGS. 33 through 36 is that added stiffness is automatically achieved with respect to the impact surface as compared to other embodiments of the invention. Specifically, the substantial degree of overlap between the inner spring panel 170 and the outer spring panel 168 results in a spring panel thickness which is essentially double that of either panel individually.

Figure 36A:
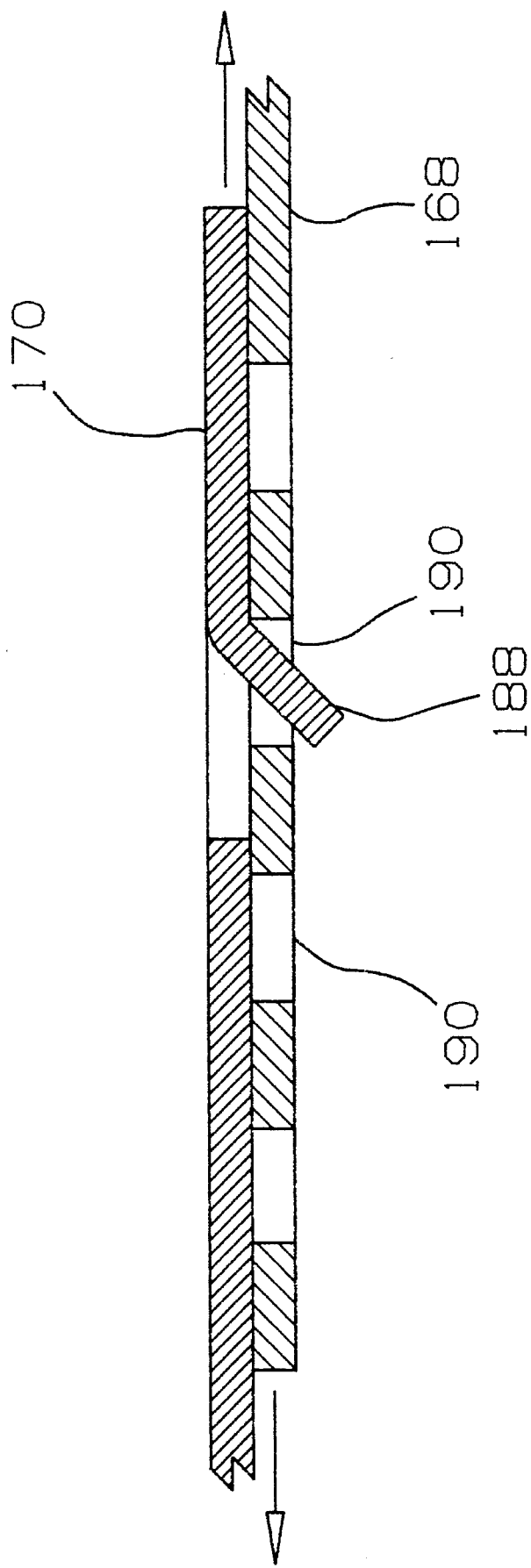
FIG. 36A is a cutaway side view showing the operation of the ratcheting mechanism in FIG. 36B.
Figure 36C:
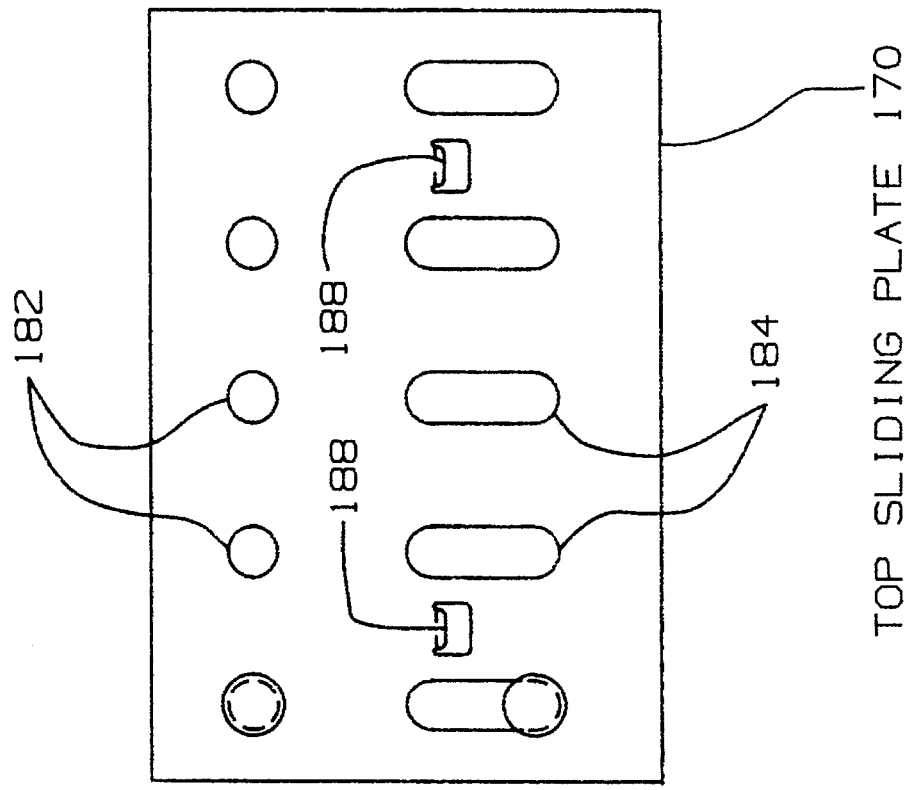
FIG. 36C is a front view of the upper portion of the bulkhead panel according to FIGS. 33A and 33B, with a ratching mechanism.
Figure 36B:
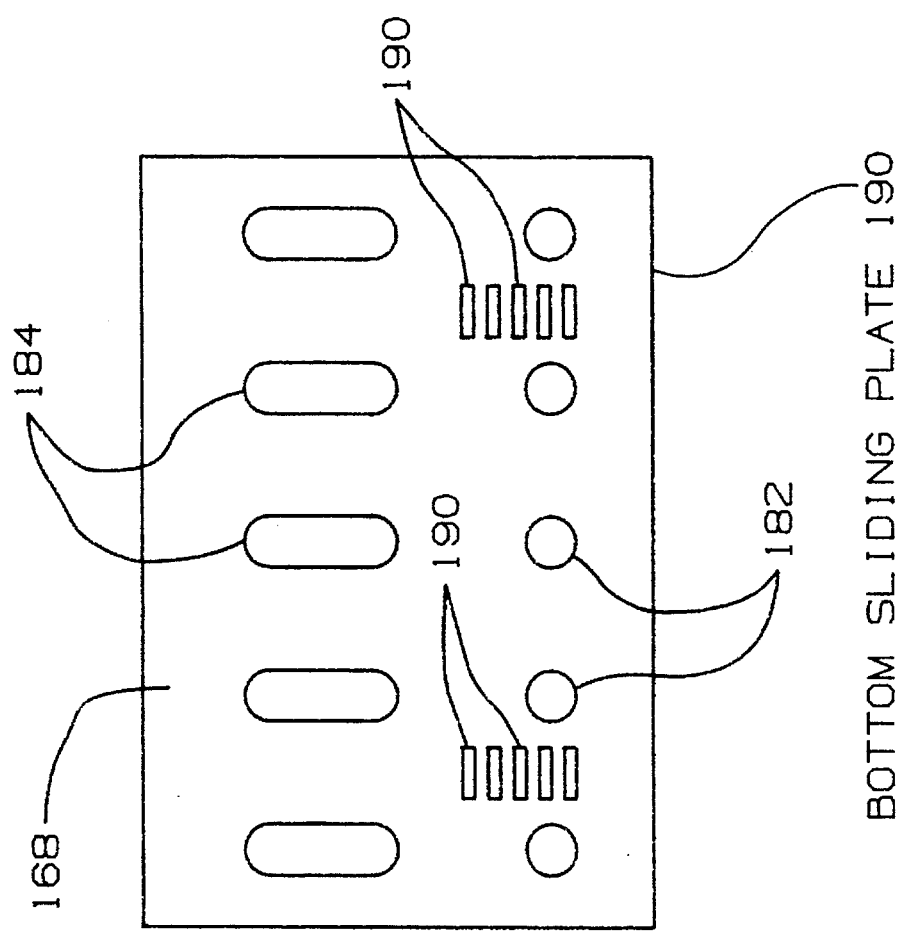
FIG. 36B is a front view of the lower portion of the bulkhead panel according to FIGS. 33A and 33B, with a ratcheting mechanism.

As shown in FIGS. 36A, 36B and 36C outer and inner spring panels 168, 170 can be prevented from returning to their original positions relative to one another by use of a ratcheting mechanism. According to FIGS. 36A, 36B and 36C, the ratcheting mechanism can include a pair of impact locks 188 formed on outer spring panel 170 resiliently protruding in the direction of inner spring panel 168. Inner spring panel 168 includes two series of vertically-spaced apertures defining impact lock ratchets 190. Impact locks 188 and impact lock ratchets 190 are positioned such that, when the panels 168, 170 are mounted on bulkhead support base 174, impact locks 188 and impact lock ratchets 190 are vertically aligned. When spring panels 168, 170 are released by latching clips 186, impact lock 188 ratchets over impact lock ratchet 190 in the direction shown in FIG. 36A. When the panels are in their fully-extended position, impact lock 188 will engage one of impact lock ratchets 190 as shown in FIG. 36A, thereby preventing spring panels 168, 170 from sliding relative to one another. When fully deployed in this manner, spring panels 168, 170 receive the benefit of having additional stiffness for absorbing an impact energy.

Figure 37B:
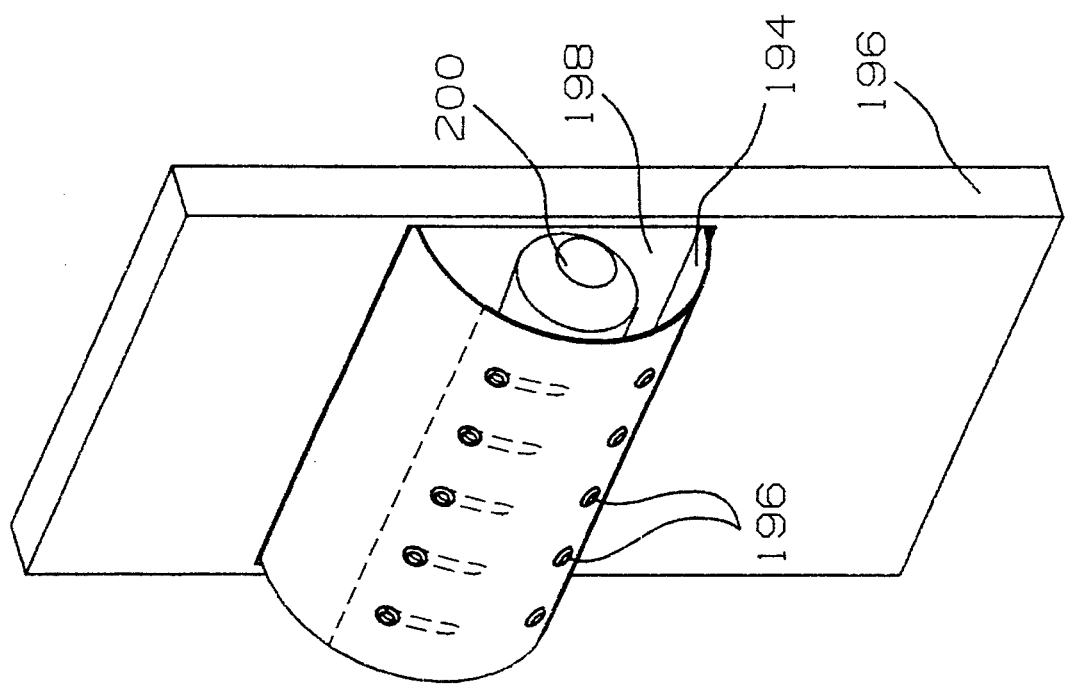
FIGS. 37A and 37B show a perspective view of an eighth embodiment according to the present invention in stored and deployed positions, respectively.
Figure 37A:
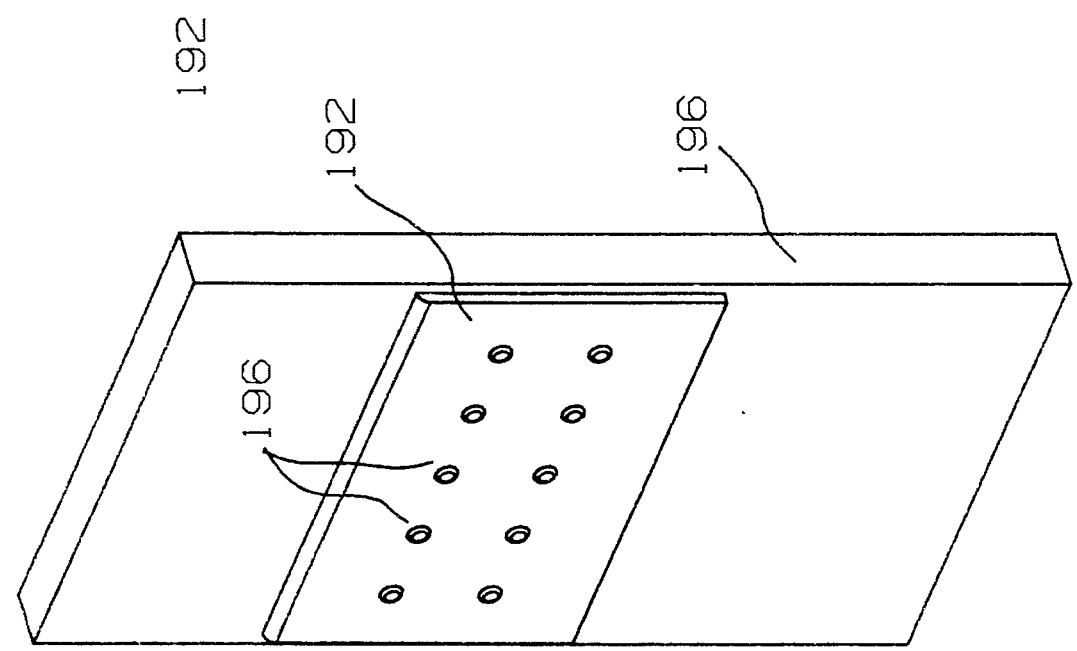

A further alternative according to the present invention is shown in FIGS. 37A and 37B. According to this embodiment of the invention, outer panel 192 is pivotally mounted along its upper edge to recessed cavity 198 of bulkhead support base 196. Likewise, inner panel 194 is pivotally mounted along its lower edge to a lower portion of recessed cavity 198. Significantly, in this embodiment, neither outer panel 192, nor inner panel 194 is formed as a spring panel in the manner previously described with respect to spring panels 168, 170. Instead, panels 192, 194 are flexible panels which are flat in their natural unstressed shape. Fitted behind inner panel 194 and outer panel 192, within recessed cavity 198, is an airbag 200 capable of inflating upon activation by a triggering device. Airbag 200 is preferably cylindrically shaped, so that upon inflation, it causes outer panel 192 and inner panel 194 to arc outwardly away from bulkhead support base 196.

In the event of a crash, a triggering device causes airbag 200 to inflate, and thereby results in outer panel 192 and inner panel 194 forming an impact surface for absorbing an impact energy of a thrown passenger. When the passenger impacts the panels 192, 194, airbag 200 is caused to deflate, and the panels 192, 194 are substantially returned to their original positions. In a preferred embodiment, a latching mechanism may be provided to latch the panels when they are caused to return to their original position, such that panels 192, 194 do not block a passenger aisle.

Figure 38:
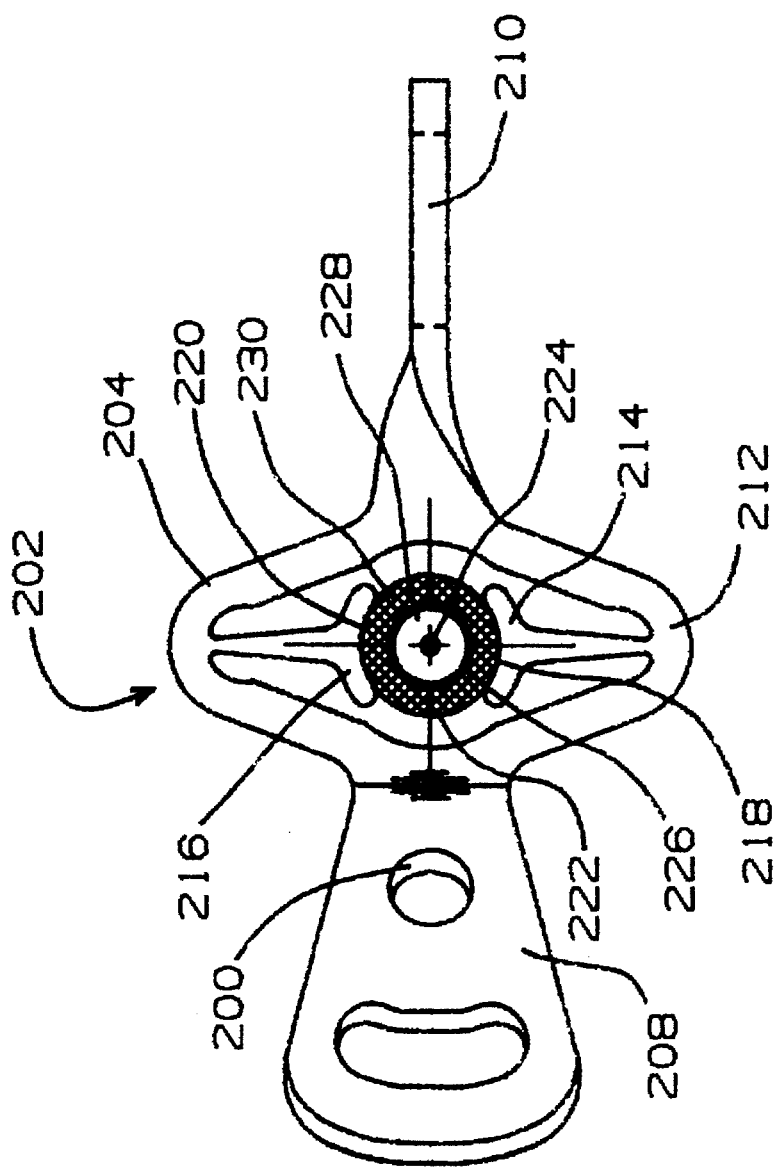
FIG. 38 is a top view of a triggering device according to the present invention.
Figure 39:
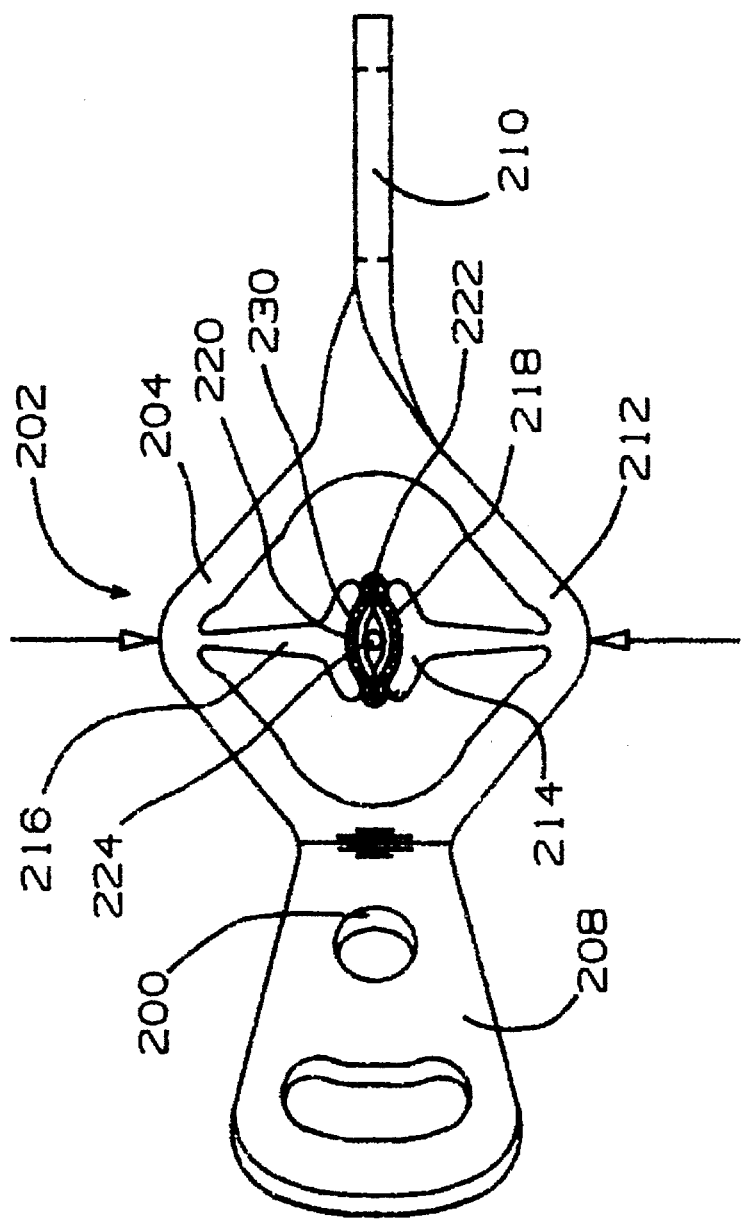
FIG. 39 is a top view of a triggering device according to the present invention shown in triggering condition.

A triggering device for the vehicle bulkhead safety system, according to the various embodiments of the present invention, is shown in FIGS. 38–40. The triggering device 202 is comprised of a profiled plate 204 which is preferably formed from S524 type stainless steel or any other suitable metal or plastic. Profiled plate 204 can include openings 206, 207 formed in an anchor portion 208 of the triggering mechanism for mounting the triggering device 202 to a structurally rigid portion of a vehicle passenger seat or to the vehicle frame. On an opposite end of the triggering device 202 from anchor portion 208 is a latch portion 210 capable of engaging a passenger seat lap belt buckle in a passenger transport vehicle. Formed between anchor portion 208 and latch portion 210 of profile plate 202 is a force-sensitive main body portion 212.

Main body portion 212 of triggering device 202 is preferably formed from a roughly elliptically-shaped outer frame member. The outer frame member is provided with opposing crush members 214, 216 which extend inwardly toward the center of the frame member. Crush members 214, 216 can be tapered in an outward direction with respect to the center of said main body portion 212. At the narrowed tapered ends of crush members 214, 216, they are preferably integrally formed with main body portion 212. Crush members 214, 216 have flared crush faces 218, 220 respectively. Transversely mounted between crush faces 218 and 220 is a coaxial cable 222 having a conductive core 224 and an annular conductor 226 forming an outer shield. The coaxial cable 222 also has an inner insulating core 228 and an outer insulation layer 230. The inner insulating core 228 is preferably removed in the area where the coaxial cable 222 extends between crush faces 218, 220.

When crash conditions exist, a passenger seated in a passenger seat will be thrown forward with substantial force by the impact of the crash. When this occurs, the passenger seatbelt constraining the passenger will be subjected to substantial forces exerted upon it by the inertial force of the passenger being thrown forward. In the present invention, the seatbelt is attached to the passenger seat by means of the triggering device 202. When sufficient force is applied to latch portion 210 in a longitudinal direction away from anchor portion 208, main body portion 212 will deform inwardly under the stress of such force, thereby causing crush members 214, 216 to be driven toward one another. When this occurs, outer insulation layer 230 and annular conductor 226 of coaxial cable 222, will be crushed inwardly as shown in FIG. 39.

As a result of crush faces 218, 220 causing annular conductor 226 to be crushed, an electrical connection will be established between conductive core 224 and annular conductor 226. This connection is facilitated by the removal of a portion of the inner insulating core which extends in the area between crush faces 218, 220. In this way, the inertial force generated by a thrown passenger will create a reliable triggering signal for initiating the safety apparatus of the present invention.

The electrical contact established by the triggering mechanism 202 can be used in a variety of ways to initiate the various embodiments of the present invention. In the embodiments of the invention shown in FIGS. 11–14, 20–22 and 37A and 37B, the electrical connection thus established can be used to cause the airbags used therein to inflate. Alternatively, in the invention according to FIGS. 15–19, the electrical connection formed by triggering mechanism 202 can be used to open an electronically controlled valve to cause hydraulic or compressed air to enter cylinder 78, 78b. In FIGS. 27, 28 and 33, the triggering mechanism can be used to control the latching mechanism, thereby releasing the various bulkhead panels used in each of those embodiments. Significantly, however, the triggering mechanism, according to the present invention is not so limited. The triggering mechanism can be used for triggering any vehicle safety system which needs to be initiated during a crash.

In FIG. 40, a side view of triggering mechanism 202 is shown with the unit mounted to a passenger seat or a rigid portion of the transport vehicle. Additional detail has been added in FIG. 40 to show a method of attaching an end of coaxial cable 222 to crush faces 218, 220. As shown in FIGS. 40 and 41, the system can include a sleeve 232 which includes guide faces 234, 236 integrally formed therewith. Guide faces 234, 236 engage body portion 212, and maintain sleeve 232 and coaxial cable 222 in position with respect to said triggering device. Guide faces 234 also perform the further function of ensuring that the frame member does not flex or warp when it deforms inwardly under crash conditions.

FIG. 41 is a cross-sectional view along line 41—41 of FIG. 40. FIG. 41 shows coaxial cable 222 passing through sleeve 232. As shown in FIG. 41, sleeve 232 is open on one end for receiving coaxial cable 222, and sealed on its opposite end to prevent dust and dirt from entering the exposed end of coaxial cable 222. As shown in FIG. 41, a portion of the inner insulating core 228 is stripped away from coaxial cable 222 where it passes through crush faces 218, 220. Thus, crush faces 218, 220 are free to form a low-resistance electrical contact between the conductive core 224 and annular conductor 226. Annular groove 238, formed in the outer insulating layer 230 of coaxial cable 222, is engaged by cable lock 240 of sleeve 232 which locks coaxial cable 222 in position within said sleeve.

According to a preferred embodiment of the present invention, the triggering device for activating energy-absorbing means includes an interlock switch located in the passenger seat associated with the bulkhead safety system. The interlock switch preferably enables the triggering mechanism when a passenger is seated in the seat for which the triggering mechanism is provided. Thus, if the interlock switch located in the passenger seat behind bulkhead panel 74, 74a, 74b is not enabled by the presence of a passenger, the energy-absorbing means for that seat will not be activated in the event of a crash.

It will be appreciated that numerous embodiments and modifications of the above safety system may now be devised by those skilled in the art, and it is intended that the appended claims cover all such modifications and embodiments as fall within the true spirit and scope of the present invention.

We claim:

1. A safety system for reducing the risk of injury during a survivable crash of a high-speed passenger vehicle, said safety system comprising:

at least one bulkhead support base mountable to the vehicle within a passenger compartment;

a bulkhead panel having a compliant impact surface, mounted to a portion of said bulkhead support base;

energy absorbing means operatively associated with said bulkhead panel for absorbing the energy of a passenger impacting on said bulkhead panel and thereby minimizing injury to said passenger;

said bulkhead support base including a recessed cavity within which said energy absorbing means may be mounted, and said bulkhead panel mounted at least partially within said recessed cavity; and said bulkhead panel pivotally mounted to said bulkhead support base by means of a hinge secured along an upper edge of said recessed cavity and an upper edge of said bulkhead panel.

2. The system according to claim 1, wherein said energy-absorbing means is an inflatable airbag, and latching means are provided for releasably latching said bulkhead panel within said recessed cavity.

3. The system according to claim 2, wherein said inflatable airbag automatically inflates upon detection of said crash.

4. The system according to claim 3, wherein said latching means automatically releases said bulkhead panel from its latched position within the recessed cavity upon inflation of said inflatable airbag, thereby permitting said bulkhead panel to pivot outwardly on said hinge to an impact-absorbing position.

5. The system according to claim 4, wherein upon impact of a passenger upon said bulkhead panel, said bulkhead will compress said inflatable airbag, thereby causing the airbag to deflate, and permitting said bulkhead panel to pivot from said impact-absorbing position to its latched position within the recessed cavity.

6. The system according to claim 1, wherein said energy-absorbing means is comprised of:

at least one pneumatic cylinder mounted within said recessed cavity in a substantially vertical orientation;

at least one extension rod linkage pivotally attached at a first end to an upper portion of said bulkhead panel spacedly offset from said hinge toward an interior portion of said cavity, said extension rod linkage attached at a second end to a piston rod downwardly extending from said pneumatic cylinder; and a source of compressed gas for operating said pneumatic cylinder.

7. The system according to claim 6, wherein said pneumatic cylinder includes a bleed valve for permitting said pneumatic cylinder to absorb an impact energy associated with a passenger striking said bulkhead panel.

8. The system according to claim 6, wherein said extension rod linkage is comprised of upper and lower portions connected together by a friction linkage, said friction linkage slidably mounted in a channel formed in said recessed cavity and capable of freely moving in a first channel direction for permitting said bulkhead panel to pivot outwardly and capable of resistively moving in a second channel direction opposite from said first channel direction for absorbing an impact-energy when said bulkhead panel pivots back toward its inward orientation.

9. The system according to claim 8, wherein said friction linkage is comprised of a link body having upper and lower rollers mounted therein, vertically spaced apart along a portion of said link body, said link body having at least one open side adjacent to a channel wall;

a wedge-shaped friction block positioned between said upper and lower rollers adjacent to said open side of said link body, said friction block movably mounted such that said upper roller will pawl against an end face of said friction block and said friction linkage will move freely in said first channel direction for causing said bulkhead panel to pivot outwardly; and said lower roller will engage a ramp face of said friction block when said slide link is moved in said second channel direction, thereby forcing said friction block against the channel wall in a drag-enhancing, energy-absorbing manner.

10. A safety system for reducing the risk of injury during a survivable crash of an airliner and thereafter avoiding blockage of passenger egress from a row of passenger seats by automatic return to a stored position, said safety system comprising:

at least one bulkhead support base mounted to the vehicle within a passenger compartment, said bulkhead support base including a recessed cavity positioned directly in front of a passenger seat, said recessed cavity being defined by upper and lower transverse walls and two oppositely facing side walls;

an energy absorbing bulkhead panel pivotally mounted to said bulkhead support base along said upper transverse wall of said recessed cavity, said bulkhead panel positioned at least partially within said recessed cavity in a latched position to minimize interference with passenger ingress and egress in a passenger row, and having a compliant impact surface on a side facing said passenger seat;

latching means for releasably latching said bulkhead panel in said latched position;

an inflatable airbag mounted within said recessed cavity, said airbag being automatically inflated upon the occurrence of an airliner crash, said inflation of said airbag causing said latching means to release said bulkhead panel from said latched position and pivot outwardly to an impact absorbing position, whereby a passenger impacting upon said outwardly pivoted bulkhead panel will cause said bulkhead panel to compress and deflate said airbag, thereby permitting said bulkhead panel to pivot to its latched position.

\* \* \* \* \*